US011680954B2

(12) United States Patent
Gilchrist

(10) Patent No.: US 11,680,954 B2
(45) Date of Patent: Jun. 20, 2023

(54) AUTOMATIC ASSAYING SYSTEM AND METHODS THEREFOR

(71) Applicant: HighRes Biosolutions, Inc., Beverly, MA (US)

(72) Inventor: Ulysses Gilchrist, Reading, MA (US)

(73) Assignee: HighRes Biosolutions, Inc., Beverly, MA (US)

(*) Notice: Subject to any disclaimer, the term of this patent is extended or adjusted under 35 U.S.C. 154(b) by 224 days.

(21) Appl. No.: 16/900,468

(22) Filed: Jun. 12, 2020

(65) Prior Publication Data

US 2021/0389339 A1 Dec. 16, 2021

(51) Int. Cl.
*G01N 35/10* (2006.01)
*B01L 3/02* (2006.01)
*G01N 35/00* (2006.01)
*G01N 35/04* (2006.01)

(52) U.S. Cl.
CPC .......... *G01N 35/1074* (2013.01); *B01L 3/021* (2013.01); *B01L 2200/04* (2013.01); *B01L 2200/14* (2013.01); *B01L 2300/021* (2013.01); *B01L 2300/0829* (2013.01)

(58) Field of Classification Search
None
See application file for complete search history.

(56) References Cited

U.S. PATENT DOCUMENTS

| 5,055,263 | A | 10/1991 | Meltzer |
| 5,306,510 | A | 4/1994 | Meltzer |
| 5,512,247 | A | 4/1996 | Bonacina et al. |
| 5,948,359 | A | 9/1999 | Kalra et al. |
| 5,958,342 | A | 9/1999 | Gamble et al. |
| 6,299,840 | B1 * | 10/2001 | Watanabe .......... G01N 35/0099 422/50 |
| 6,325,114 | B1 | 12/2001 | Bevirt et al. |

(Continued)

FOREIGN PATENT DOCUMENTS

| EP | 1363736 | 11/2003 |
| WO | 2016141000 | 9/2016 |

OTHER PUBLICATIONS

International Search Report, International Application No. PCT/US2016/020326, dated Jun. 13, 2016.

*Primary Examiner* — Matthew D Krcha
*Assistant Examiner* — Brittany I Fisher
(74) *Attorney, Agent, or Firm* — Perman & Green, LLP

(57) ABSTRACT

An automatic assaying system having a multiplex pipette cartridge section in which pipette cartridges are docked. At least one pipette cartridge has a different pipetting characteristic from another corresponding pipette cartridge, the different pipetting characteristic being selectable from a number of different pipetting characteristics. A multiplexing work item holder has an array of work item holder docks that dock corresponding work item holders selectable from pipette trays and pipette tip set racks that define the selectable different pipetting characteristic. One or more of the work item holder docks are indexed to selectably multiplex both the different interchangeable pipette trays and the at least one pipette set rack. A carrier moves the pipette cartridge or a work item holder carriage and a controller selects the at least one pipette tip set rack corresponding to a work item holder dock so as to effect automatic selection of the different pipetting characteristic.

19 Claims, 11 Drawing Sheets

(56) References Cited

U.S. PATENT DOCUMENTS

| | | |
|---|---|---|
| 7,858,041 B2 | 12/2010 | Muraishi et al. |
| 7,968,060 B2 | 6/2011 | Van Tuyl |
| 8,211,301 B2 | 7/2012 | Safar et al. |
| 8,282,895 B2 | 10/2012 | Miller et al. |
| 8,404,492 B2 | 3/2013 | Bladassari et al. |
| 8,638,509 B2 | 1/2014 | Blasenheim et al. |
| 8,865,474 B2 | 10/2014 | Paschetto et al. |
| 9,028,754 B2 | 5/2015 | Winter et al. |
| 2003/0215357 A1 | 11/2003 | Malterer et al. |
| 2004/0081583 A1 | 4/2004 | Berndt et al. |
| 2004/0096360 A1 | 5/2004 | Toi et al. |
| 2006/0188409 A1 | 8/2006 | Chang et al. |
| 2010/0105074 A1 | 4/2010 | Covey et al. |
| 2012/0291872 A1 | 11/2012 | Brady et al. |
| 2013/0280145 A1 | 10/2013 | West et al. |
| 2013/0295597 A1 | 11/2013 | Dewitte et al. |
| 2014/0045186 A1 | 2/2014 | Gubatayao et al. |
| 2014/0154043 A1 | 6/2014 | Hofstadler et al. |
| 2014/0260696 A1 | 9/2014 | Criswell |
| 2016/0256866 A1* | 9/2016 | Nichols .............. G01N 35/1072 |

* cited by examiner

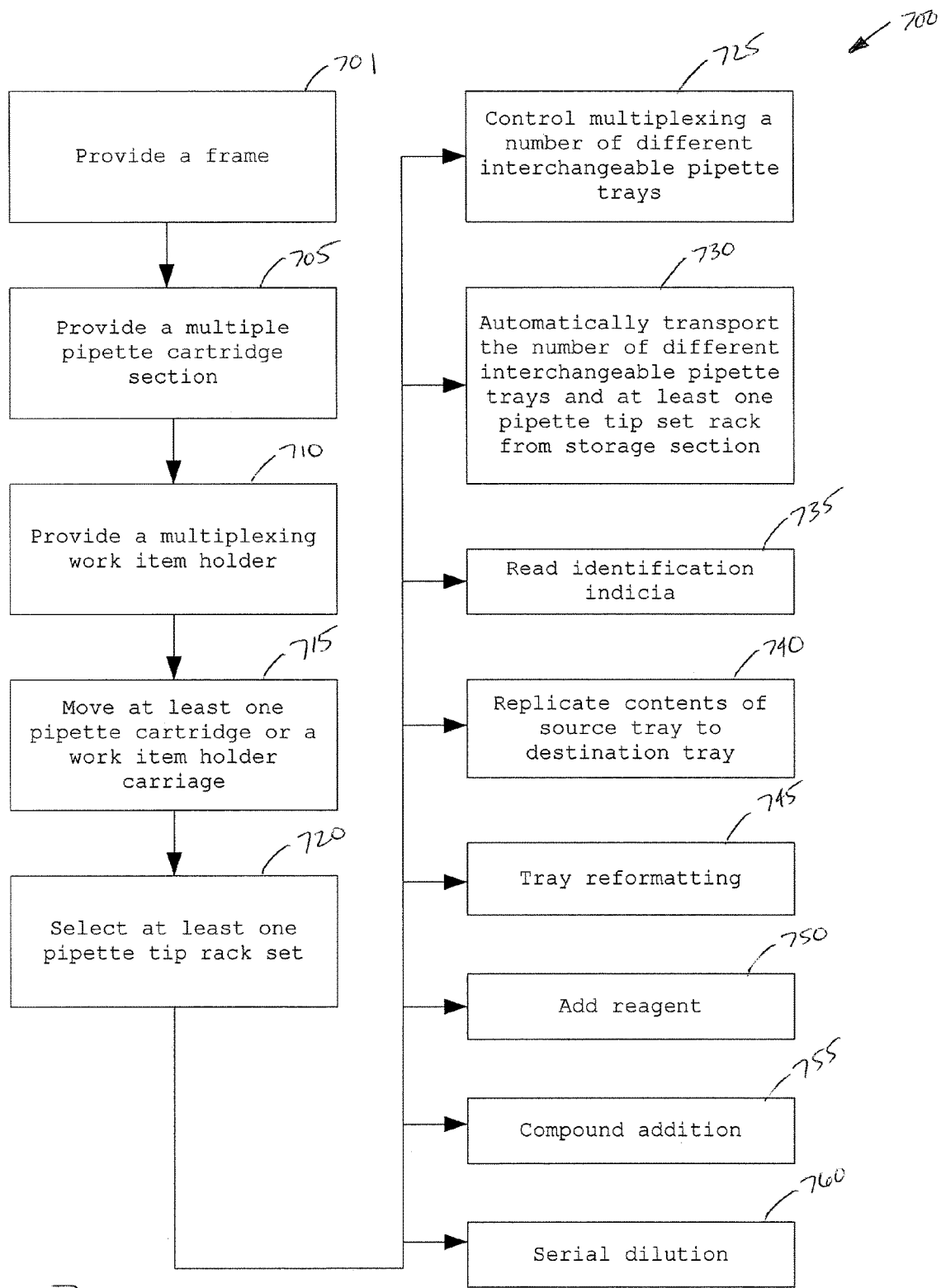

_US 11,680,954 B2_

AUTOMATIC ASSAYING SYSTEM AND METHODS THEREFOR

BACKGROUND

1. Field

The exemplary embodiments generally relate to life sciences equipment, and more particularly, to pipetting equipment for use in the life sciences industry.

2. Brief Description of Related Developments

Pipettors, also referred to as chemical droppers, are laboratory tools commonly used in the life sciences industry to dispense a volume of liquid. As life sciences equipment has advanced, many pipettors have been integrated into automated systems. While these automated systems have improved the accuracy and control of pipetting procedures, these conventional automated systems can be less than dynamic in their ability to handle distinct pipetting procedures.

BRIEF DESCRIPTION OF THE DRAWINGS

The foregoing aspects and other features of the disclosed embodiment are explained in the following description, taken in connection with the accompanying drawings, wherein:

FIG. 7 is a block diagram of an exemplary method incorporating aspects of the present disclosure;

DETAILED DESCRIPTION

Figure 1:
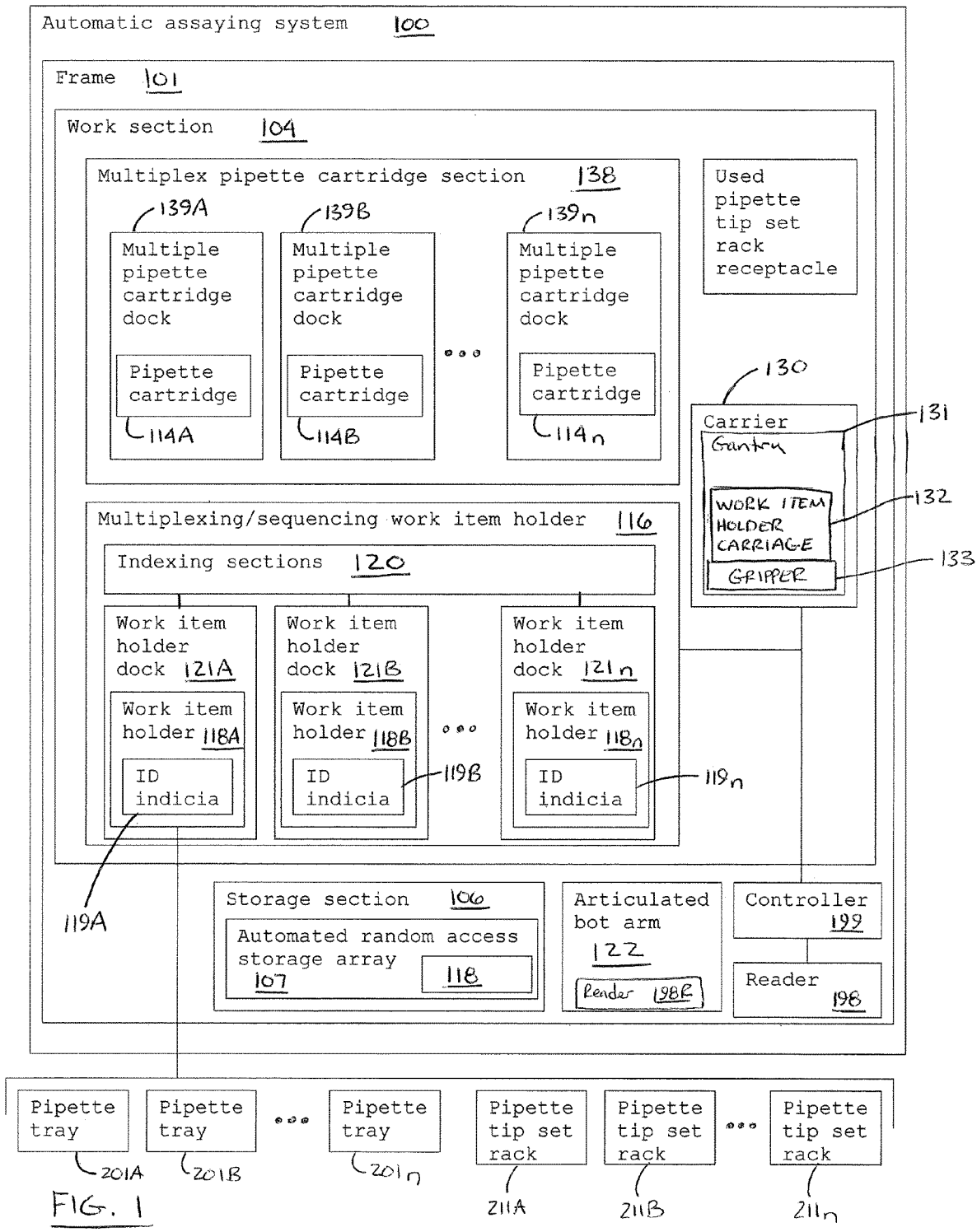
FIG. 1 is a schematic block diagram of an automatic assaying system incorporating aspects of the present disclosure.
Figure 2:
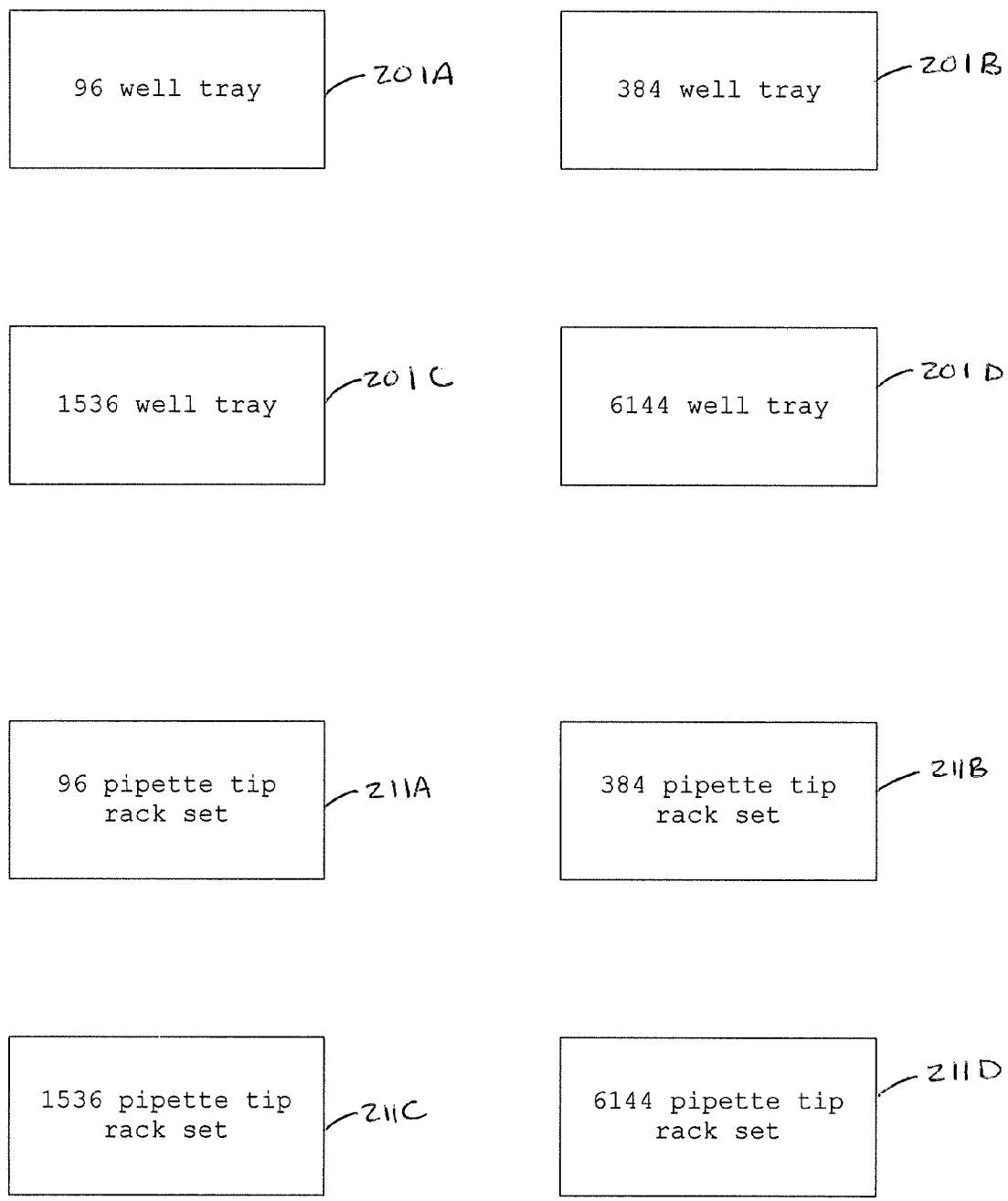
FIG. 2 illustrates non-limiting examples of work item holders of the automatic assaying system of FIG. 1 in accordance with aspects of the present disclosure.

Referring to FIG. 1 an exemplary automatic assaying system 100 is illustrated in accordance with aspects of the present disclosure. Although the aspects of the present disclosure will be described with reference to the drawings, it should be understood that the aspects of the present disclosure can be embodied in many forms. In addition, any suitable size, shape or type of elements or materials could be used.

The automatic assaying system 100 is configured to provide a substantially continuous uninterrupted flow of work item holders 118 between a storage section 106 of the automatic assaying system 100 and a work section 104 of the automatic assaying system 100. The work item holders 118 are transferred in the substantially continuous uninterrupted flow from the storage section 106 to the work section 104 in any suitable multiplexed order (e.g., forming the substantially continuous uninterrupted flow) so that when the work item holders 118 are presented to a carrier 130 of the automatic assaying system 100 (i.e., that effects pipetting operations), at least a predetermined pipetting protocol can be performed on predetermined groups of work item holders 118 belonging to a respective pipetting protocol. The term multiplexed as used herein refers to the insertion of work item holders 118 corresponding or belonging to different pipetting protocols into the (single) substantially continuous uninterrupted flow of work item holders 118 between the storage section 106 and the work section 104 in a manner similar to that in which communication signals are combined for transmission over a single shared medium (the substantially continuous uninterrupted flow of work item holders 118 being the shared medium as effected by one or more of the articulated bot arm 122, the indexing section 120, and the carrier 130 as described herein and work item holders 118 of different pipetting protocols may be intermixed with each other in the substantially continuous uninterrupted flow of work item holders 118).

The number of pipetting protocols that are performed in, for example, life sciences assays is large. The aspects of the present disclosure provide for the flexible loading of work item holders 118 to the automatic assaying system 100, where flexible refers the ability to load and unload work item holders from the automatic assaying system substantially without interrupting work flow through the automatic assaying system. In some aspects, the flexibility of the automatic assaying system 100 is effected at least in part by loading generic work item holders that are useful for more than one pipetting protocol, reagents, compounds, pipette tip set racks, etc. in advance (e.g., prior to a desired pipetting operation) to the storage section 106 (e.g., an unused supply of these work items are continuously stored in the storage section and used as desired in an opportunistic manner depending on a desired pipetting protocol) or as needed in a just-in-time manner (e.g., the work items are loaded to the storage section when requested or immediately prior to a pipetting protocol) for random access of the work item holders 118 to effect completion (or partial completion) of a pipetting protocol in accordance with desired pipetting protocols to be performed by the automatic assaying system 100.

The predetermined pipetting protocols that are performed on respective groups of work item holders 118 include, but are not limited to, pipette tray (also referred to as sample holder tray) replication, pipette tray reformatting (e.g., expansion and/or compression), reagent addition, compound addition, and serial dilution. Pipette tray replication is the replication of the contents of a source pipette tray to one or more destination pipette trays (i.e., the contents of each destination pipette tray replicates the contents of the source pipette tray). Pipette tray reformatting involves moving samples between pipette trays having a different number of sample wells. Tray expansion reformatting is an operation that spreads the contents of sample wells of a source pipette tray having a first number of sample wells to more than one destination pipette tray each having a second number of sample wells that is different than the first number of sample wells of source pipette tray (e.g., the contents of a source pipette tray having 384 sample wells is expanded to four destination pipette trays each having 96 sample wells). Tray compression reformatting is an operation that spreads the contents of sample wells of more than one source pipette tray each having a first number of sample wells to a destination pipette tray having a second number of sample wells that is different than the first number of samples wells of each source tray (e.g., the contents of four source pipette trays each having 96 sample wells is compressed to one destination pipette tray having 384 sample wells). Reagent addition refers to the addition of any suitable liquid from a source pipette tray (or any other suitable reservoir) that is added to the sample wells of a destination pipette tray. Compound addition is the transfer of a set of compounds, or samples, from a source pipette tray to a destination pipette tray. Serial dilution is used to set up different sample concentrations for an experiment where a measured amount of high concentration sample is transferred from a source pipette tray to a destination pipette where that high concentration sample is mixed with a dilution solvent creating a lower concentration sample.

In accordance with the aspects of the present disclosure the storage section 106 includes a reader 198 that is configured to identify each work item holder 118 within the storage section 106 so as to effect the multiplexed or otherwise sequenced ordered transfer of the work item holders 118 from the storage section 106 to the work section 104 for performing a predetermined work/pipetting protocol. As will be described herein, the reader 198 is configured to, with a controller 199 of the automatic assaying system 100, resolve a sequence of pipette trays 201A-201B and/or pipette tip set racks 211A-211n (referred to herein as work item holders 118), from the storage section 106, and sequence (e.g., multiplex) the work item holders 118 with automation within the work section 104 according to the predetermined pipetting protocol, and further resolve automatically any blockages in work item multiplexing/sequencing that may exist in the transfer of the work item holders 118 from the storage section 106 to the work section 104 and/or the multiplexing/sequencing within the work section 104.

Figure 3:
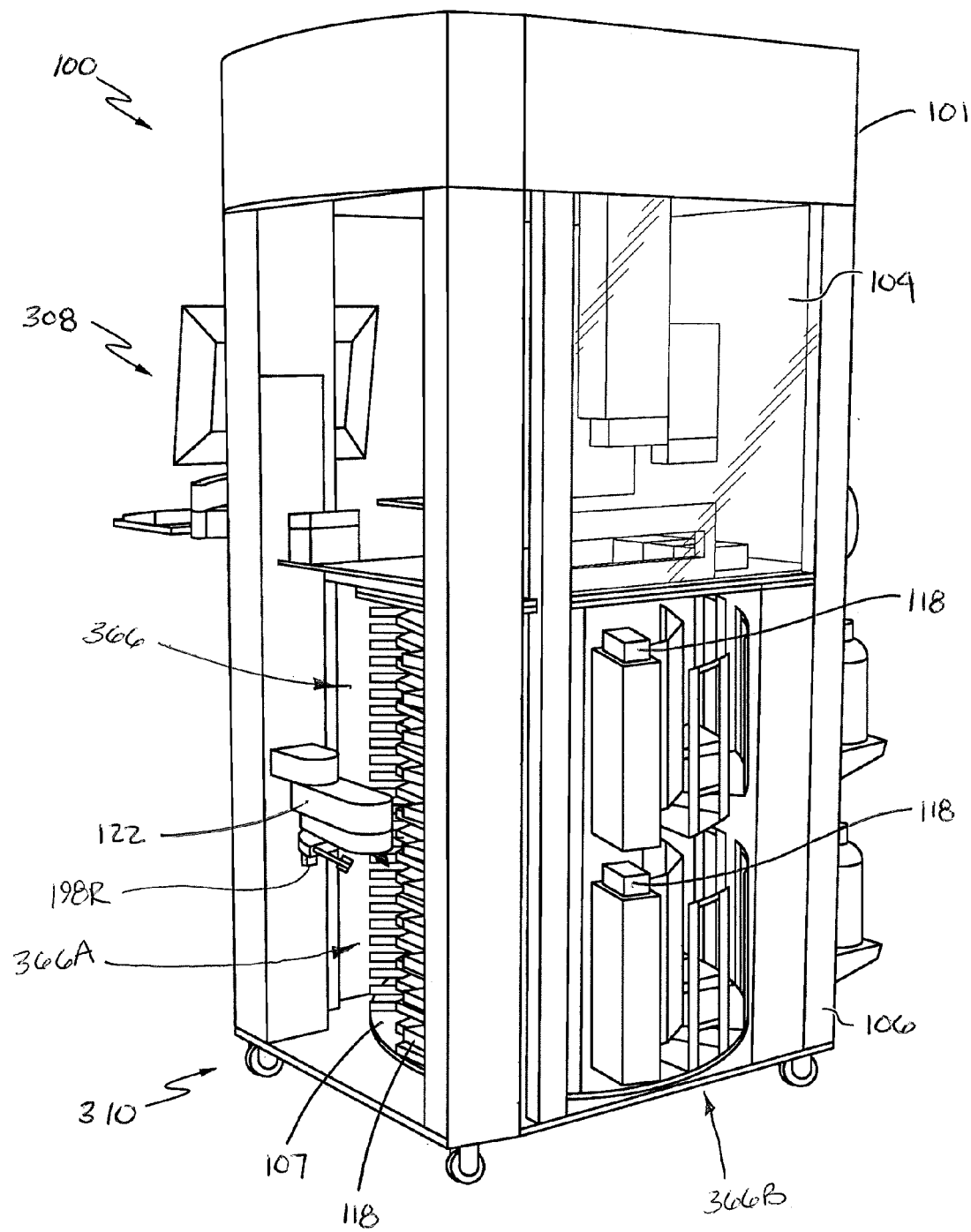
FIG. 3 is a side perspective illustration of the automatic assaying system of FIG. 1 in accordance with aspects of the present disclosure.
Figure 4:
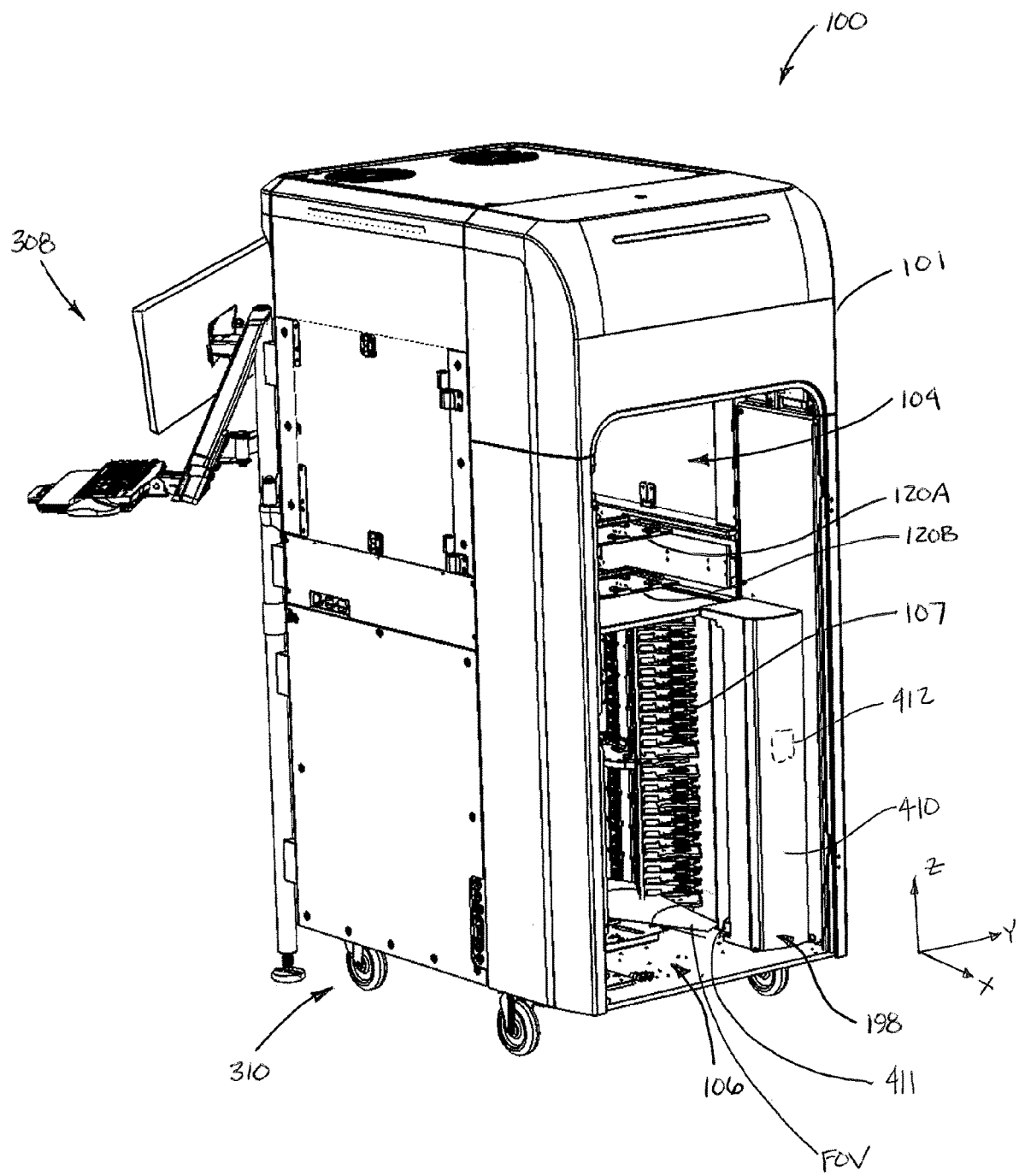
FIG. 4 is a side perspective illustration of the automatic assaying system of FIG. 1 in accordance with aspects of the present disclosure.

Referring to FIGS. 1, 3, and 4, a user of the automatic assaying system 100 initializes a sequence corresponding to multiple pipetting protocols (or in some aspects one or more pipetting protocols) where, for example, the user enters or selects in a controller 199 of the automatic assaying system 100, through a user interface 308 of the automatic assaying system 100, multiple predetermined pipetting/work protocols based on source pipette trays (i.e., pipette trays having a source of specimens on which assays are to be performed) and/or pipette tip set rack holders 211A-211n held in the storage section 106. The controller 199 registers (or saves) the user selection of the multiple predetermined pipetting/ work protocols in the controller 199 (e.g., the controller includes any suitable memory) or in any suitable memory accessible by the controller 199. As described herein, the controller 199 is configured to automatically effect the registered more than one predetermined work protocols in a substantially continuous series, wherein for each different predetermined work protocol the controller 199 resolves, based on the respective different predetermined pipetting characteristic, a different corresponding sequence of the pipette trays 201A-201n and at least one pipette tip set rack 211A-211n in and with the multiplexing/sequencing work item holder 116 (that determines sequence location and indexing for each pipette tray 201A-201n and the at least one pipette tip set rack 211A-211n) for the corresponding sequence and sequence transition between different registered predetermined pipetting/work protocols to effect the different registered predetermined pipetting/work protocols substantially continuously.

As will be described in further detail herein, the source pipette trays, pipette tip set racks 211A-211n, and/or destination pipette trays (i.e., pipette trays into which a portion of the source of specimen in the source pipette tray is transferred) are manually loaded into the storage section 106 or loaded into the storage section 106 with any suitable automation. A reader 198 of the automatic assaying system 100 reads or otherwise identifies the contents of the storage section 106 so as to map locations of the work item holders 118 in the storage section, characterize and identify the work item holders 118 in the storage section 106, and/or identify missing or miss-loaded work item holders in the storage section 106. The controller 199 is configured to sequence the registered predetermined pipetting/work protocols in series dependent on map info of the pipette trays 201A-201n and the at least one pipette tip set rack 211A-211n in store (e.g., in the storage section 106). Based on the reading of the work item holders 118 in the storage section 106 by the reader 198, the controller 199 is configured to compare each of the user selected pipetting protocols (and desired work item holders for performing those selected pipetting protocols) with the contents of the storage section 106 to verify that the selected pipetting protocols can be performed using the work item 118 stored in the storage section 106. For each selected pipetting protocol that can be performed using the work item holders 118 stored in the storage section 106, for each of the selected pipetting protocols the controller 199 is configured to present verification to the user through the user interface 308 that the selected pipetting protocol will be performed. If a work item 118 desired for a selected pipetting protocol is missing, miss-loaded or is otherwise unselectable, the controller 199 is configured to present a notification to the user, for each pipetting protocol that cannot be performed, through the user interface 308 that the selected pipetting protocol is unselectable or cannot be performed until the missing, miss-loaded or is otherwise unselectable work item holder 118 is remedied. As described herein, remedying of the missing, miss-loaded or is otherwise unselectable work item holder 118 may be performed while the automatic assaying system 100 is performing work/pipetting operations.

The controller 199 is configured to, based on the selected pipetting protocols, identify and determine (from the map of the storage locations noted above) locations of the source pipette tray(s), the destination pipette tray(s), and/or the pipetting tip set rack(s) desired for each of the selected pipetting protocols. The controller 199 generates a multiplexing/sequencing of the desired work item holders 118 to move the desired work item holders automatically from the storage section 106 to the work section 104, and then back to the storage section 106 or to any suitable output of the automatic assaying system 100 (where output of the work item holder 118 effects transfer of the work item holder 118 to the user). The multiplexing/sequencing of the desired work item holders 118 provides for the segway/switching (e.g., in the multiplexing/sequencing) from a terminus sequence/multiplex of one pipetting protocol to a start multiplex/sequence of another pipetting protocol so that a substantially continuous uninterrupted flow of work item holders is maintained between the storage section 106 and the work section 104. For example, the controller 199, when nearing the terminus multiplex/sequence of the one pipetting protocol, determines which of the selected pipetting protocols to perform next (i.e., the sequence in which the selected pipetting protocols is effected automatically by the controller as described herein), where the controller 199 effects pre-loading of work item holders 118 for the next/following pipetting protocol in the work section 104 prior to the terminus multiplex/sequence of the one/previous pipetting protocol.

To resolve any blockages in the multiplexing/sequencing of a predetermined pipetting protocol, the controller, in one aspect, re-sequences the predetermined pipetting protocol in its entirety (e.g., a different pipetting protocol unaffected by the blockage is performed instead of the pipetting protocol affected by the blockage) and/or partially re-sequences the predetermined pipetting protocol so as to be performed in multiple steps (e.g., a first pipetting protocol unaffected by the blockage is partially performed, at least a second pipetting protocol is performed, and then first pipetting protocol is completed once the blockage is remedied) to maintain the substantially continuous uninterrupted flow of work item holders 118. Such blockages may be a result of a predetermined work item holder 118 not be loaded into (i.e., present/stored within) the storage section 106, the predetermined work item holder 118 being incorrectly loaded in the storage section 106, or any other circumstance where a predetermined work item holder 118 cannot be transferred from the storage section 106 to the work section 104. As may be realized, in some aspects, the system and method described herein provide for execution of a variety of pipetting operations (such as those described above and referred to herein as work protocols or pipetting protocols) within the automatic assaying system 100 substantially without manual intervention.

Figure 5A:
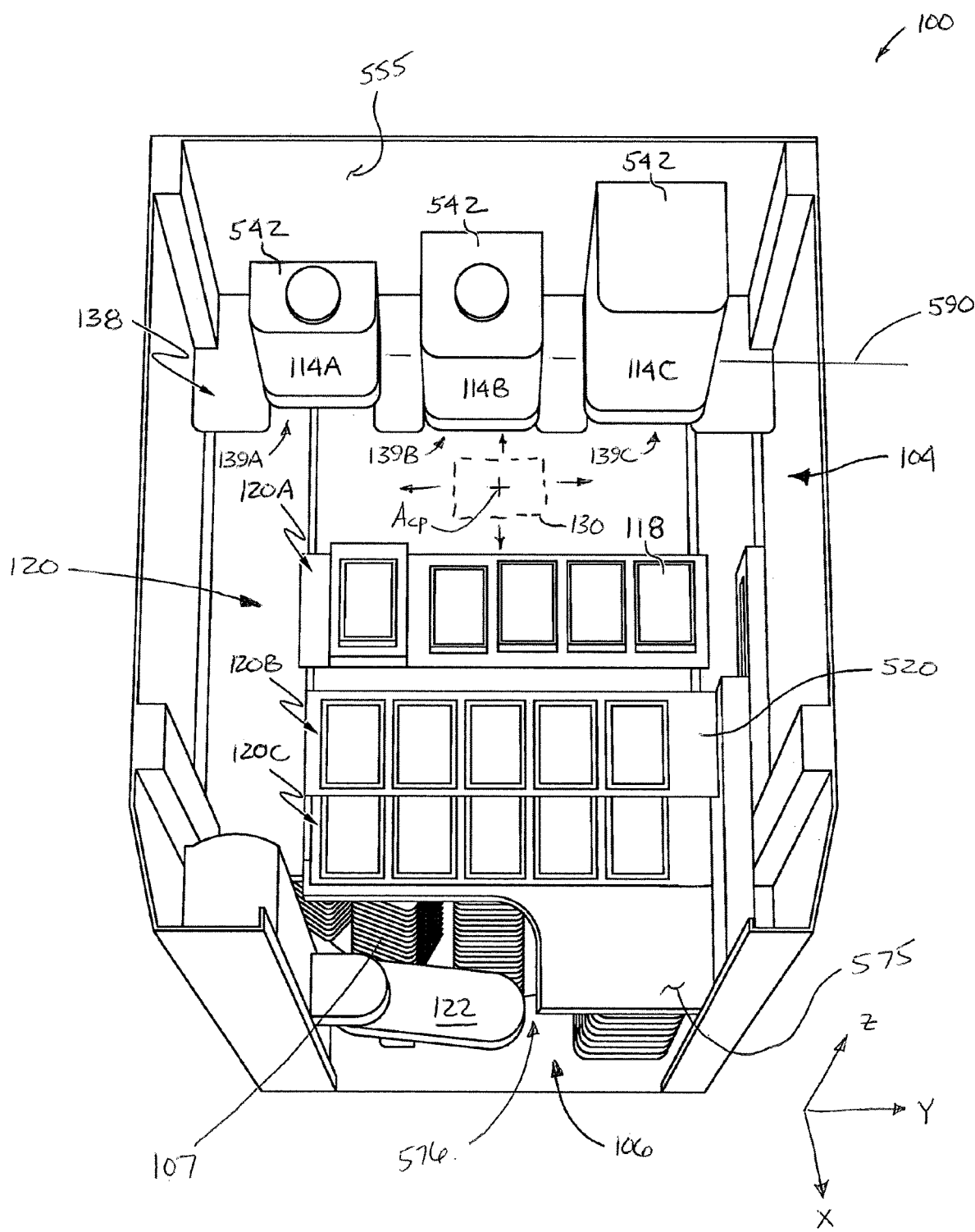
FIG. 5A is a top perspective illustration of portions of the automatic assaying system of FIG. 1 in accordance with aspects of the present disclosure.

Still referring to FIG. 1 and also to FIGS. 2, 3, 4, and 5A, the automatic assaying system 100 includes a frame 101, a multiplex pipette cartridge section 138, a multiplexing work item holder 116 (also referred to herein as a sequencing work item holder), a carrier 130, and a controller 199. The multiplex pipette cartridge section 138 is connected to the frame 101 and has an array of multiple pipette cartridge docks 139A-139n (where n is an integer that denotes an upper numerical limit to the number of multiple pipette cartridge docks) arrayed along an array axis 590 (FIG. 5A). Each multiple pipette cartridge dock 139A-139n of the multiple pipette cartridge docks 139A-139n is configured to dock a corresponding pipette cartridge 114A-114n (where n is an integer that denotes an upper numerical limit to the number of pipette cartridges), where at least one pipette cartridge 114A-114n of the corresponding pipette cartridges 114A-114n has a different pipetting characteristic from another corresponding pipette cartridge 114A-114n. The different pipetting characteristic is selectable from a number of different pipetting characteristics that include, but are not limited to, a number of pipetting tips (e.g., a single row of pipetting tips, an array of tips corresponding to standard SBS tray types such as 96 well trays, 384 well trays, 1536 well trays, 6144 well trays or any other tray having any suitable number of wells), a type of pipetting tip(s) (e.g., disposable tips made of various types of plastics that are designed to be discarded and replaced after each pipetting action, or fixed tips made of stainless steel tube (or other suitable material) that are used repeatedly and washed between pipetting actions), and/or any other suitable pipetting characteristic.

In accordance with aspects of the present disclosure, the pipette cartridges 114A-114n have interchangeable pipette tip set racks 211A-211n that can reconfigure a pipette cartridge 114A-114n from having a first pipetting characteristic to a second different pipetting characteristic. As described herein, the different pipette tip set racks 211A-211n are transferred from the storage section 106 to the work section 104 for coupling with a predetermined pipette cartridge 114A-114n so as to change the pipetting characteristic of the predetermined pipette cartridge. As may be realized, the pipette cartridge 114A-114n (and/or the pipette tip set racks 211A-211n of one or more the pipette cartridges 114A-114n) are automatically changed so as to change the different pipetting characteristic to effect a pipetting protocol as described herein and maintain a substantially continuous uninterrupted flow of work item holders 118 and a substantially continuous uninterrupted execution of more than one pipetting protocol by the automatic assaying system 100.

The multiplexing work item holder 116 is connected to the frame and includes an array of work item holder docks 121A-121n (where n is an integer that denotes an upper numerical limit to the number of work item holder docks) that are disposed facing the array of multiple pipette cartridge docks 139A-139n and are substantially aligned with the array axis 590 (FIG. 5A). Each work item holder dock 121A-121n of the array of work item holder docks 121A-121n is configured to dock a corresponding work item holder 118A-118n (where n is an integer that denotes an upper numerical limit to the number of work item holders). The work item holders 118A-118n are generally referred to as work item holders 118 and are selectable from a number of different interchangeable pipette trays 201A-201n (where n is an integer that denotes an upper numerical limit to the number of different interchangeable pipette trays) and at least one pipette tip set rack 211A-211n (where n is an integer that denotes an upper numerical limit to the number of pipette tip set racks) that defines the selectable different pipetting characteristic. In accordance with aspects of the present disclosure, each of the different interchangeable pipette trays 201A-201n has a different work characteristic. For example, the number of different interchangeable pipette trays 201A-201n comprise pipette trays with different work sample wells or receptacles capacities. Where the different work characteristic is a number of sample wells, the different interchangeable pipette trays 201A-201n include 96 well trays 201A, 384 well trays 201B, 1536 well trays 201C, 6144 well trays 201D, trays with less than 96 wells, and/or trays with more than 6144 wells. In accordance with aspects of the present disclosure each of the 96 well trays 201A, 384 well trays 201B, 1536 well trays 201C, 6144 well trays 201D, trays with less than 96 wells, and/or trays with more than 6144 wells may also have varying receptacle capacities (e.g., the volume of each well may vary for the same type of tray such as a volume of the wells of one 96 well tray may be greater than a volume of the wells of another 96 well tray). The different interchangeable pipette trays 201A-201n are standardized so as to have a SBS-format footprint (e.g., the base of the tray has a standardized length and width, i.e., footprint) or any other suitable standardized footprint that facilitates the interchangeability of the pipette trays 201A-201n.

As noted above, the at least one pipette tip set rack 211A-211n defines the selectable different pipetting characteristic of the pipette cartridge 114A-114n to which it is coupled/connected. Here, the at least one pipette tip set rack 211A-211n is interchangeable from a number of different pipette tip set racks 211A-211n, each having a different set of (or type of) a different predetermined number of one of more pipette tips. For example, the selectable different pipetting characteristic is a 96 pipette tip set rack 211A (e.g., having 96 pipette tips), a 384 pipette tip set rack 211B (e.g., having 384 pipette tips), a 1536 pipette tip set rack 211C (e.g., having 1536 pipette tips), a 6144 pipette tip set rack 211D (e.g., having 6144 pipette tips), a pipette tip set rack having less than 96 pipette tips, and a pipette tip set rack having more than 6144 pipette tips, where the pipette tips of the selectable pipette tip set racks 211A-211n are either fixed (e.g., reusable) or disposable as described herein.

Figure 5B:
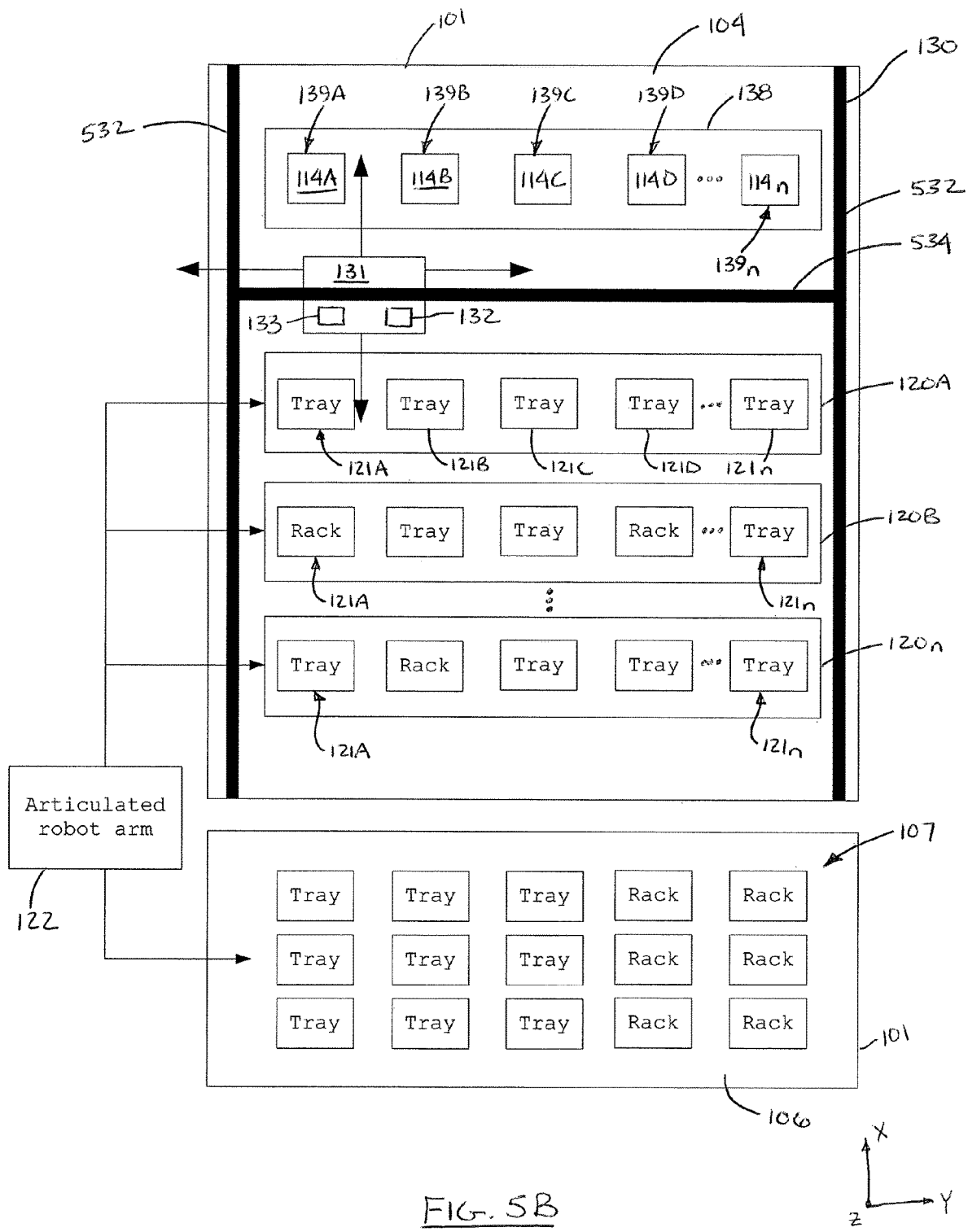
FIG. 5B is a schematic diagram illustrating portions of the automatic assaying system of FIG. 5A in accordance with aspects of the present disclosure.

Referring to FIGS. 1, 5A and 5B, the multiplexing work item holder 116 has indexing sections 120 indexing one or more of the work item holder docks 121A-121n relative to the frame 101 between different positions so as to selectably multiplex both the different interchangeable pipette trays 201A-201n and the at least one pipette set rack 211A-211n corresponding to the work item holder dock 121A-121n. For example, the work section 104 includes a set of pipette cartridges 114A-114n docked in the multiplex pipette cartridge section 138 (e.g., at a respective multiple pipette cartridge dock 139A-139n). The work section 104 further includes at least one indexing section 120A-120n holding a respective set (e.g., at least one) of work item holders 118A-118n. The work section 104 includes any suitable drive section to effect movement of the at least one indexing section 120A-120n as described herein. Each of the indexing sections 120A-120n includes distinct work item holder docks 121A-121n, which include at least one static nest position 118 (such as for example, indexing section 120A), and at least one dynamic nest position 520 (such as for example, tray docks 120B-120n). In one or more aspects of the present disclosure, the dynamic nest positions 520 are at distinct heights (Z-direction) within the work section 104, and are adjustable horizontally (X-direction) within the work section 104. In one or more aspects, one indexing section can be loaded/unloaded onto/off-of the static nest position 118 from one of the dynamic nest positions 520 by an articulated bot (or robot) arm 122, which is movable in the X-direction, Y-direction and Z-direction.

The carrier 130 is connected to the frame 101 and includes a gantry 131 arranged so as move, with a gripper 133 (also referred to as a cartridge carriage) of the gantry 131, the at least one pipette cartridge 114A-144n or a work item holder carriage 132 (e.g., which may be integrated with or in addition to the gripper 133 and transports the work item holders 118), of the carrier 130, relative to the frame 101 between the array of multiple pipette cartridge docks 139A-139n and the array of work item holder docks 121A-121n multiplexing the at least one pipette cartridge 114A-114n and interfacing the at least one pipette cartridge 114A-114n with multiplexing one of the different interchangeable pipette trays 201A-201n and the at least one pipette tip set rack 211A-211n at the array of work item holder docks 121A-121n.

Referring to FIGS. 1 and 5B, the carrier 130 is coupled to frame 101 within the work section 104 above the multiplex pipette cartridge section 138 and the multiplexing work item holder 116 so that the gantry 131 moves relative to the frame for transporting/moving the at least one pipette cartridge 114A-114n or a work item holder carriage 132 within the work section 104. The gantry 131 is mounted to the frame 101 in any suitable manner, and includes at least two distinct tracks, e.g., at least one stationary track 532 (two shown) aligned in a first direction (X-direction), and a movable track 534 aligned in a second direction (Y-direction) distinct from the first direction. The movable track 534 can be coupled to the stationary track(s) 532, e.g., by complementary track integration, meaning that the movable track 534 can move within the stationary track(s) 532, such that the movable track 534 remains perpendicular to the stationary track(s) 532. In the aspect illustrated in FIG. 5B the at least one stationary track 532 includes two distinct stationary tracks 532 aligned in parallel with each other, where the two distinct stationary tracks 532 are aligned perpendicular to the movable track 534; however, in other aspects the carrier 130 may have any suitable configuration that provides three dimensional movement to the gripper 133 and/or work item holder carriage 132 for transporting the at least one pipette cartridge 114A-114n or a work item holder carriage 132 within the work section 104. As may be realized, the carrier 130 includes any suitable drive section for effecting the movement of the gantry 130 as described herein.

As shown in FIGS. 5A and 5B, the carrier 130 is configured to transport each of the set of pipette cartridges 114A-114n to a pipetting location, e.g., a location of at least one of the pipette trays 201A-201n within a work item holder dock 121A-121n in the work section 104. As described herein, the carrier 130 is configured to move each pipette cartridge 114A-114n (e.g., held by the carrier 130) in a third direction (Z-direction) perpendicular to both the first (X) and second (Y) directions. In one or more aspects, the gantry 131 is configured to rotate the gripper 133 about a primary axis Acp (i.e., of the gripper 133 and/or work item holder carriage 132) such that the carrier 130 can circumferentially navigate about one or more of the pipette cartridges 114A-114n. Further, the carrier 130, when engaged with a pipette cartridge 114A-114n, can rotate that pipette cartridge 114A-114n about the primary axis Acp, which may facilitate pipetting operations, as well as facilitates loading and/or unloading of pipette cartridges 114A-114n to and from the multiple pipette cartridge dock 139A-139n and/or pipette tip set rack 211A-211n loading and/or unloading to and from the pipette cartridges 114A-114n at the work item holder docks 121A-121n of the indexing sections 120.

In one or more aspects, for example, as shown in FIG. 5A, the pipette cartridges 114A-144n are docked in respective multiple pipette cartridge docks 139A-139n which are coupled to a sidewall 555 of the interior of the work section 104. The multiple pipette cartridge docks 139A-139n can be located in such a manner that the carrier 130 engages the pipette cartridges 114A-114n from a top surface 542 of the pipette cartridges 114A-114n. However, in aspects, the pipette cartridges 114A-114n are docked in multiple pipette cartridge docks 139A-139n that are coupled to a ceiling of the work section 104, such that the pipette cartridges 114A-114n hang from overhead mounts in the work section 104. In these aspects, the carrier 130 can be configured to engage a side of the pipette cartridges 114A-114n and transport the pipette cartridges 114A-114n to/from the work item holders 118A-118n located at the work item holder docks 121A-121n and the multiple pipette cartridge docks 139A-139n.

In accordance with the aspects of the present disclosure, and referring again to FIGS. 1, 3, 4, 5A and 5B, the frame 101 is arranged so that the multiplex pipette cartridge section 138, the multiplexing work item holder 116, and the carrier 130 are disposed in the work section of the frame 104. The automatic assaying system 100 further comprises the storage section 106 connected to the frame 101. In the aspects illustrated in the Figs. the storage section 106 is located beneath the work section 104; however, in other aspects the storage section 106 may be located above the work section 104 or to a side of the work section 104 (e.g., in the same horizontal plane as the work section 104). The storage section 106 has an automated random access storage array 107 configured for storing therein work item holders 118. For example, the automated random access storage array 107 is configured to store each pipette tray 201A-201n of the number of different interchangeable pipette trays 201A-201n and each of the at least one pipette tip set rack 211A-211n isolated from the work section 104 where the pipette trays 201A-201n and the at least one pipette tip rack set 211A-211n are loaded and unloaded from at least one of the work item holder docks 121A-121n. As illustrated in FIGS. 3, 4, and 5A, the automated random access storage array 107 is in the form of a rotatable carousel that has stacked holding locations 366 arranged radially about an axis of rotation of the carousel. The stacked holding locations 366 include holding locations 366A for holding the pipette trays 201A-201n and holding locations 366B for holding the pipette tip set racks 211A-211n.

Referring to FIGS. 1, 3, and 5A, the automatic assaying system 100 includes the articulated bot arm 122 which is movably connected to the frame 101. The articulated bot arm 122 is illustrated as a SCARA (Selective Compliant Articulated Robot Arm) type arm; however, in other aspects the articulated bot arm 122 has any suitable configuration for transporting work item holders 118 as described herein. In one aspect, the articulated bot arm may be substantially similar to that described in U.S. patent application Ser. No. 16/653,537 filed on Oct. 15, 2019 and titled "Pipettor System" (now U.S. Pat. No. 10,613,110 issued on Apr. 7, 2020), the disclosure of which is incorporated herein by reference in its entirety. The articulated bot arm 122 is configured to automatically transport each of at least one of the number of different interchangeable pipette trays 201A-201n and the at least one pipette tip set rack 211A-211n from respective holding locations 366 of storage section 106 to and from the work section 104 and loading and unloading a corresponding work item dock 121A-121n with the at least one of the number of different interchangeable pipette trays 201A-201n and the at least one pipette tip set rack 211A-211B being transported. For example, the storage section 106 and the work section 104 are fluidly connected (such that a fluid, e.g., air, water, etc. may pass between) such that the pipette trays 201A-201n and the pipette tip set racks 211A-211n can be passed between the work section 104 and the storage section 106 (and vice versa) with the articulated bot arm 122 (or other suitable lift system). The storage section 106 stores pipette trays 201A-201n and pipette tip set racks 211A-211n when not in use in the work section 104.

The articulated bot arm 122 is configured to move the pipette trays 201A-201n and the pipette tip set racks 211A-211n along the Z direction between the work section 104 and the storage section 106 (see FIG. 5A). For example, the work section 104 and the storage section 106 are separated by a partition wall 575. The partition wall 575 includes a passage 576 that is shaped and sized to provide passage of the articulated bot arm 122 between the work section 104 and the storage section 106. In one or more aspects the passage 576 is a sealable passage. In addition to movement in the Z direction (e.g., for transport of work item holders 118 between the work section 104 and the storage section 106) the articulated bot arm 122 is also configured to move in the X-Y plane to move the work item holders 118 (e.g., such as the pipette trays 201A-201n and the pipette tip set racks 211A-211n) in the X and Y directions within each of the work section 104 and the storage section 106. Movement of the work item holders 118 in at least the X-Y plane within the storage section 106 facilitates insertion and removal of the work item holders 118 to and from the automated random access storage array 107. Movement of the work item holders 118 in at least the X-Y plane within the work section 104 facilitates insertion and removal of the work item holders 118 to and from the work item holder docks 121A-121n of the indexing sections 120.

In accordance with the aspects of the present disclosure, referring to FIGS. 1 and 4, the automatic assaying system 100 includes the reader 198 which is connected to the frame 101 and is communicably coupled to the controller 199. The reader 198 is disposed to read identification (ID) indicia 119A-119n identifying a tray characteristic and rack characteristic related to the different pipetting characteristic, of each pipette tray 201A-201n and each of the at least one pipette tip set rack 211A-211n stored in the automated random access storage array 107 of the storage section 106. The tray characteristic corresponds to at least one of the selectable different pipetting characteristic, and the rack characteristic is determinative of at least one of the selectable different pipetting characteristic. For example, in one or more aspects aspect, the reader includes a reader housing 410, a scanner 411, and any suitable drive system 412 (e.g., linear actuator, ball screw drive, etc.). The housing is mounted or otherwise coupled to the frame 101 so that the scanner 411 faces the automated random access storage array 107. The work item holders 118 are positioned within the automated random access storage array 107 so that the identification indicia 119A-119n of each work item holder 118 is visible (i.e., within a field of view FOV) of the scanner 411. The scanner 411 is any suitable scanner such as one or more of a barcode reader, a laser scanner, a charged coupled device (CCD) sensor, a complementary metal oxide semiconductor (CMOS) sensor, or any other suitable optical sensor configured to read the identification indicia 119A-199n. The scanner 411 is connected to the drive system 412 so that the drive system 412 drives the scanner in the Z direction to read the identification indicia 119A-119n of each work item holder 118 in the stacks of stacked holding locations 366, where rotation of the automated random access storage array facilitates scanning of each stack of the stacked holding locations 366 by the reader 198. In other aspects, the automated random access storage array 107 and reader 198 have any suitable configurations for holding and scanning the work item holders 118 in the storage section 106. For example, the reader 198R (FIGS. 1 and 3), in some aspects, is located on the articulated bot arm 122 (but is otherwise similar to reader 198) where the articulated bot arm 122 positions the reader in the X, Y, and/or Z directions to read the identification indicia 119A-119n of each work item holder 118 in the stacks of stacked holding locations 366, where rotation of the automated random access storage array facilitates scanning of each stack of the stacked holding locations 366 by the reader 198. In still other aspects, the automatic assaying system 100 both reader 198 and reader 198R.

Figure 6A:
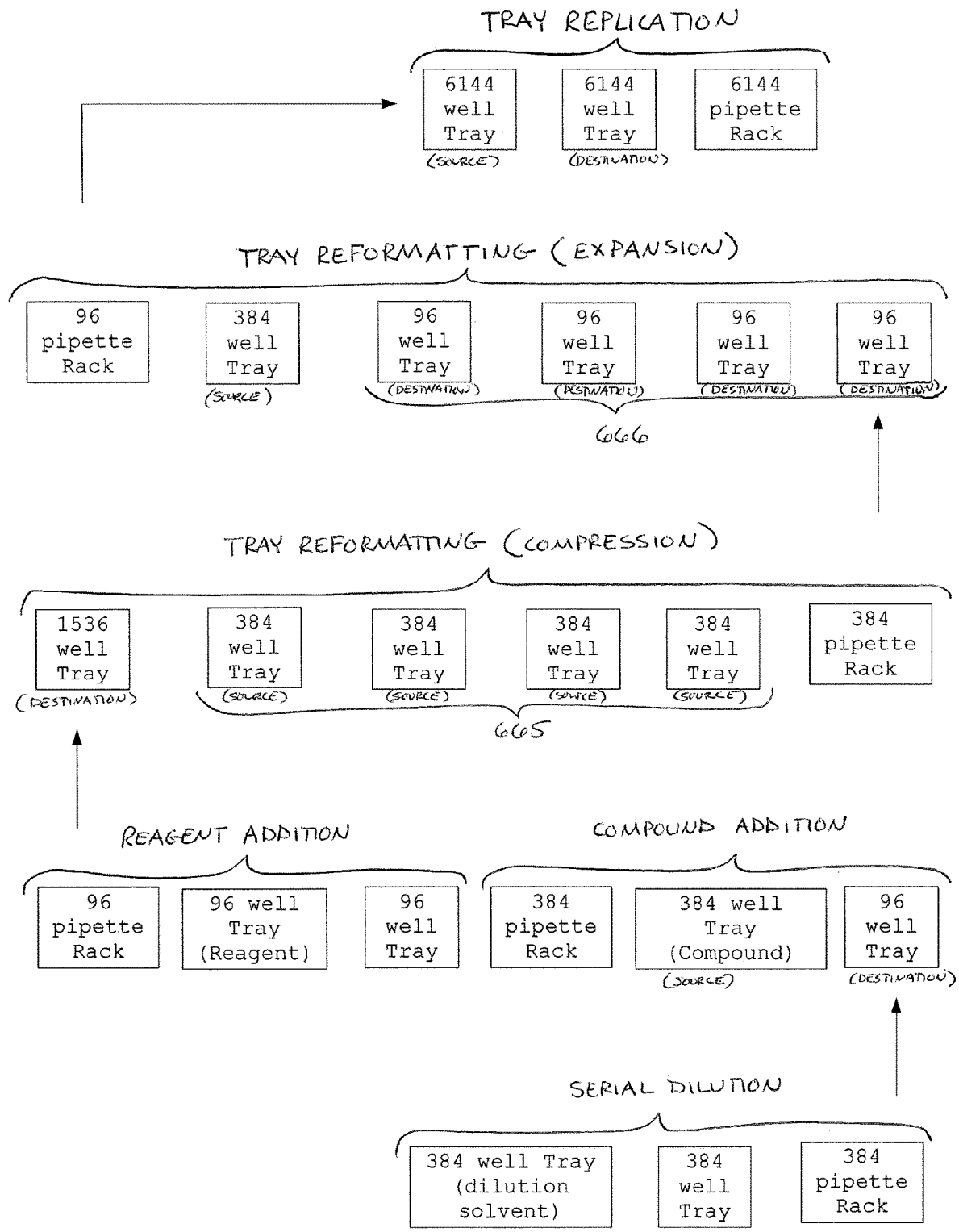
FIG. 6A is a schematic illustration of an non-limiting exemplary multiplexed/sequenced workflow through the automatic assaying system of FIG. 1 in accordance with aspects of the present disclosure.

As noted above, the identification indicia 119A-119n identifies a tray characteristic and rack characteristic related to the different pipetting characteristic of the pipette trays 201A-201n and the pipette tip set rack 211A-211B. For example, with respect to the pipette trays 201A-201n, the identification indicia 119A-119n identifies one or more of the number of wells in a respective pipette tray 201A-201n, a volume of each well of a respective pipette tray 201A-201n or any other suitable characteristic. The identification indicia 119A-119n identify, in one or more aspects, a tray characteristic relating one pipette tray 201A-201n to other pipette trays 201A-201n of a set of pipette trays 665, 666 (see FIG. 6A) with the different pipetting characteristic being common to each pipette tray 201A-201n of the set 665, 666. For exemplary purposes only, each pipette tray in the set 665 has the common characteristic of each pipette tray having 384 wells; while each pipette tray in the set 666 has the common characteristic of each pipette tray having 96 wells. The identifying indicia also identify the work item holders 118 (e.g., such as through assignment and registering of the pipette trays with the controller 199) associated with (or otherwise part of) a pipetting protocol. For example, still referring to FIG. 6A, the work item holders associated with each of the pipetting protocols are associated with each other in the controller 199 to identify which work item holders 118 are related to each other via a common (i.e., the same) pipetting protocol. Here, for exemplary purposes only, the work item holders 118 (i.e., the 96 pipette rack, the 384 well tray, and the four 96 well trays) corresponding to the expansion tray reformatting shown in FIG. 6A are related to/associated with each other in the controller 199 (or any suitable memory accessible by the controller) through the respective identification indicia 119A-119n of the respective work item holders 118.

The controller 199 is communicably coupled (e.g., via a wired or wireless communication connection) to the multiplexing work item holder 116 and the carrier 130. The controller 199 is configured to select the at least one pipette tip set rack 211A-211n corresponding to a work item holder dock 121A-121n so as to effect automatic selection of the different pipetting characteristic of the at least one pipette cartridge 114A-114n via the interface between the at least one pipette cartridge 114A-114n and the multiplexed one of the corresponding pipette trays 201A-201n and pipette tip set rack 211A-211n at the array of work item holder docks 118A-118n. For example, the controller 199 is programmed to perform one or more predetermined pipetting protocols (such as those illustrated in FIG. 6B), where a user selects the predetermined pipetting protocols. The controller 199 is programmed in any suitable manner such as through a user interface 308 (see FIGS. 3 and 4) of the automatic assaying system 100 or through any other user interface coupled to the controller 199. The work item holders 118 for completing the selected one or more pipetting protocols are loaded into the storage section 106 in any suitable manner. In one aspect the work item holders 118 are loaded (and/or unloaded) into the automated random access storage array 107 manually; while in other aspects, the work item holders 118 are loaded (and/or unloaded) into the automated random access storage array 107 with any suitable automation, such as where the automatic assaying system 100 is part of a larger automated system. For example, the articulated robot arm 122 may transfer the work item holders 118 from (or to) a cart or storage located outside the frame 101, and accessible to the articulated robot arm 122, to (or from) the automated random access storage array 107. In other aspects, any suitable robot arm or transfer device located on a cart or other suitable location/equipment interfaced with the automatic assaying system 100 may extend into the frame 101 for placing (or removing) the work item holders 118 to (or from) the automated random access storage array 107).

In one or more aspects, the reader 198 identifies the work item holders loaded into the automated random access storage array 107 and the controller 199 receives the identification information from the reader 198. The controller 199 is configured to register the identifications of the work item holders 118 within the automated random access storage array 107 in a memory of or accessible by the controller 199. The controller 199 is configured to compare the contents of the random access storage array 107 (as determined by the reader 198) with desired work item holders for completing the selected one or more pipetting protocols to verify that the desired work item holders 118 for completing the selected one or more pipetting protocols are present in the random access storage array 107. Where all of the work item holders 118 are not present the controller 199 causes an alert (e.g., aural or visual) to be presented to an operator of the automatic assaying system 100 through, for example the user interface 308 (see FIGS. 3 and 4).

The controller 199 is configured to issue control commands to the articulated bot arm 122, the automated random access storage array 107, and the multiplexing work item holder 116 so that the desired work item holders 118 for completing the selected one or more pipetting protocols are transferred in the substantially continuous uninterrupted flow from the storage section 106 to the work section 104 in any suitable multiplexed order (e.g., forming the substantially continuous uninterrupted flow). The multiplexed order is such that the work item holders 118 are presented to the carrier 130 (i.e., holding a pipette cartridge 114A-114n that effects pipetting operations of a predetermined one of the selected pipetting protocols) so that at least the predetermined pipetting protocol can be performed on predetermined groups of work item holders 118 belonging to/corresponding with the respective pipetting protocol as determined by the pipette characteristic of the at least one pipette cartridge 114A-114n used to complete the predetermined pipetting protocol.

Referring to FIGS. 1, 3, 4, and 6A, in accordance with the aspects of the present disclosure, an order in which the selected pipetting protocols is performed is automatically selected by the controller 199. The respective different interchangeable pipetting characteristic of the at least one pipette cartridge 114A-114n for each pipetting protocol is automatically selected by the controller 199 with the ordering of the selected pipetting protocols. In one or more aspects the order in which the selected pipetting protocols is performed is a dynamic order in that the order may be modified or changed so that the sequencing of the selected pipetting protocols can be rearranged during operation. For example, referring to FIG. 6A, the controller 199 determines a predetermined order of performing the pipetting protocols based on, e.g., data entered (e.g., the protocols to be performed) by an operator through the user interface 308 (see FIGS. 3 and 4) is shown where the protocols are performed in the order of tray replication, tray reformatting (expansion), tray reformatting (compression), reagent addition, compound addition, and serial dilution. As noted above, the reader 198 verifies the presence or absence (e.g., physically not present, inserted incorrectly in a storage location, or any other miss-insertion of the work item holder that prevents reading the identification indicia or automated transport within the automatic assaying system 100) of the pipette set tip racks 211A-211n and the pipette trays 201A-201n corresponding to the pipetting protocols within the automated random access storage array 107.

The absence of a work item holder 118 may be referred to herein as a blockage in sequencing of the desired pipetting protocols where the controller 199 is configured to resolve (e.g., find a solution to) the blockage so as to maintain the substantially continuous uninterrupted flow of work item holders 118 between the storage section 106 and the work section 104. For example, where one or more of the pipette set tip racks 211A-211n and the pipette trays 201A-201n are determined to be absent from the from the automated random access storage array 107, rather than halt operations of the automatic assaying system 100, the controller 199 is configured to rearrange the pipetting protocol order in any suitable manner so that pipetting protocols (or portions thereof) with the desired work item holders 118 present in the automated random access storage array 107 are performed while, in an aspect where the work item holders 118 are provided to the storage section 106 manually, an alert (e.g., aural or visual) is presented to an operator through the user interface 308 to rectify the absence of the one or more of the pipette set tip racks 211A-211n and the pipette trays 201A-201n; while in other aspects where the work item holders 118 are provided to the storage section 106 with any suitable automation, a request or a command for the desired work item holders to be transferred to the storage section 106 may be made by the controller 199 to any suitable automation to effect transfer of the desired work item holders 118 to the storage section 106. For example, where one or more of the 96 pipette rack, 384 well tray, or 96 well tray for the expansion tray reformatting is/are determined to be absent the expansion tray reformatting protocol may be moved to the end of the protocol performance order/sequence so that the expansion tray reformatting protocol is performed last; while in other aspects a portion of the expansion tray reformatting protocol for which the work item holders 118 are present may be performed where a remaining portion of the expansion tray reformatting protocol is performed at a later time in the protocol performance order/sequence when the work item holders 118 become available. In this manner, the substantially continuous uninterrupted flow of work item holders 118 between the storage section 106 of the automatic assaying system 100 and the work section 104 of the automatic assaying system 100 is effected.

In providing the substantially continuous uninterrupted flow of work item holders 118 between the storage section 106 and the work section 104 the controller 199 is configured to operate the operate the storage section 106, the work section 104, and the articulated bot arm 122 so as to multiplex or sequence the number of different interchangeable pipette trays 201A-201n with the multiplexing work item holder 116 according to the different pipette characteristic of the at least one pipette cartridge 114A-114n. The number of different pipette trays 201A-201n multiplexing corresponds respectively with the different interchangeable pipetting characteristic, of the at least one pipette cartridge 114A-114n, ahead of automatic selection and behind automatic selection of the different pipetting characteristic. For example, still referring to FIGS. 1 and 6A and also to FIG. 6B, the controller 199 automatically selects (such as when dynamically determining a processing order of the pipetting protocols) the different interchangeable pipetting characteristics of the 6144 pipette rack, the 96 pipette rack, and the 384 pipette rack to effect the pipetting operations of, for example, any suitable desired pipetting protocol in the sequence of pipetting protocols, such as tray replication, expansion tray reformatting, and compression tray reformatting. In one or more aspects, the 6144 pipette rack, the 96 pipette rack, and the 384 pipette rack are provided as disposable pipette tip rack sets from the storage section 106 and are associated with one or more of the pipette cartridge 114A-114n, where one of the pipette cartridges 114A-114n picks up a respective one of the 6144 pipette rack, the 96 pipette rack, and the 384 pipette rack from the multiplexing work item holder 116; however in other aspects the pipette tip set racks may be fixed pipette set tip rack that are coupled to a respective pipette cartridge 114A-114n in any suitable manner (e.g., provided directly to the work section 104 with a respective pipette cartridge 114A-114n or transferred to and coupled with the respective pipette cartridge 114A-114n from the storage section 106) and cleaned as desired for reuse in multiple pipetting protocols.

The pipette tip set racks 211A-211n (such as the 6144 pipette rack, the 96 pipette rack, and the 384 pipette rack noted above) and the pipette trays 201A-201n of the respective pipetting protocols are transferred to the work area 104 from the storage area 106 in any suitable manner so that the desired work item holders 118 are presented to the carrier 130 for executing/performing the desired pipetting protocol. For example, the work item holders 118 need not be transferred from the storage area 106 to the work area 104 in a predetermined sequence (e.g., all work items 118 for the tray replication pipetting protocol are transferred to the work area prior to the work items of the expansion tray reformatting pipetting protocol, etc.) but rather, the work items may be transferred in an optimized manner (e.g., shortest transfer times, etc.) as determined by the controller 199 to effect the substantially continuous uninterrupted flow of work item holders 118. For example, the controller 199 is communicably coupled to the multiplexing/sequencing work item holder 116 and the carrier 130 and is configured to select the at least one pipette tip set rack 211A-211n corresponding to the work item holder dock and effect, via random access sequencing of each corresponding pipette cartridge 114A-114n, automatic selection of the different pipetting characteristic of at least one pipette cartridge. In one or more aspects, the controller 199 is configured to select the at least one pipette tip set rack 211A-211n corresponding to the work item holder dock 121A-121n and effect, via random access sequencing of each corresponding pipette cartridge 114A-114n, automatic selection of the different pipetting characteristic of at least one pipette cartridge 114A-114n based on the rack characteristic identified by the reader 198.

Figure 6B:
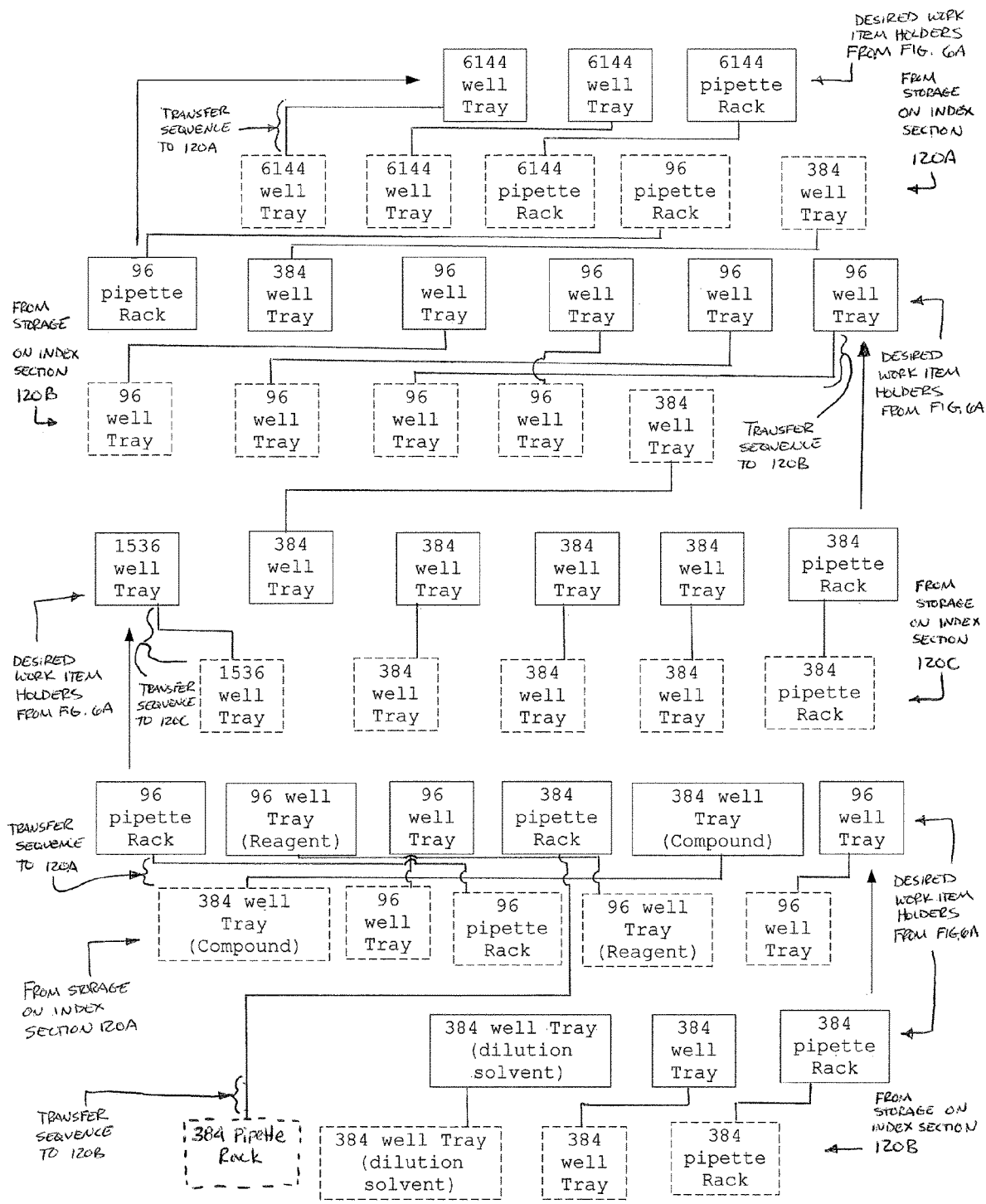
FIG. 6B is a schematic illustration of an non-limiting exemplary multiplexed/sequenced workflow from a storage section of the automatic assaying system to a work section of the automatic assaying system to effect the non-limiting exemplary multiplexed/sequenced workflow of FIG. 6A in accordance with aspects of the present disclosure.

Referring to FIG. 6B the pipetting protocols of FIG. 6A are shown alongside an exemplary order in which the work items 118 of those pipetting protocols are randomly accessed by the articulated bot arm 122 from the automated random access storage array 107 and transferred to the indexing sections 120A-120C of the multiplexing/sequencing work item holder 116. For exemplary purposes only and referring to the pipetting protocol sequence illustrated in FIG. 6A, an exemplary random access loading of the indexing sections 120 will be described. In the random access sequencing example shown in FIG. 6B, the 384 well tray and 96 pipette rack of the expansion tray reformatting pipetting protocol are placed on indexing section 120A ahead of (i.e., multiplexed with) the 6144 well trays and the 6144 pipette rack of the tray replication pipetting protocol. The remaining 96 well trays of the expansion tray reformatting pipetting protocol are placed on indexing section 120B followed by a 384 well tray of the compression tray reformatting pipetting operation. In this manner, referring to FIGS. 5A and 5B, indexing section 120A, once loaded as noted above, is presented to the carrier 130 by moving the indexing sections 120A-120C in one or more of the Z, X, and Y directions to the carrier 130 so that the desired work item holders 118 for the tray replication pipetting protocol are presented to the carrier, along with a portion of the work item holders for the expansion tray reformatting pipetting protocol (noting that indexing section 120B may continue to be loaded with the work item holders 118 noted above).

As can be seen in FIGS. 5A and 5B, multiple indexing section 120A-120C can be simultaneously presented to the carrier 130. Here the indexing section 120B is also presented to the carrier so that in combination with indexing section 120A the desired work item holders 118 for the expansion tray reformatting pipetting operation along with some of the work item holders 118 for the compression tray reformatting pipetting operation are presented to the carrier 130. The controller 199 issues commands to the carrier 130 so that the tray replication pipetting protocol and the expansion tray reformatting are executed using indexing section 120A and 120B while indexing section 120C is loaded with the 1536 well tray, the remaining 384 well trays, and the 384 pipette tip set rack of the compression tray reformatting pipetting operation. The indexing sections 120A-120C are multiplexed so that indexing section 120A is presented to the articulated bot arm 122 for unloading/returning the work items 118 thereon to the storage section 106, while indexing sections 120B, 120C are presented to the carriage 130 for execution of the compression tray reformatting. During the compression tray reformatting, the indexing section 120A is loaded with the desired work items 118 for the reagent addition and compound addition pipetting protocols in the order of the 96 well tray (of the compound addition pipetting protocol), the 96 well tray (containing reagent) (of the reagent addition pipetting protocol), the 96 pipette tip set rack, the 96 well tray (of the reagent addition pipetting protocol), and the 384 well tray (containing compound) (of the compound addition pipetting protocol). The indexing sections 120A-120C are multiplexed so that indexing section 120B is presented to the articulated bot arm 122 for unloading/returning the work items 118 thereon to the storage section 106, while indexing sections 120C, 120A are presented to the carriage 130 for execution of at least the reagent addition pipetting protocol. Once unloaded, the remaining 384 pipette rack of the compound addition pipetting protocol is loaded on indexing section 120B along with the 384 pipette tip set rack, the 384 well tray, and the 384 well tray (containing dilution solvent) of the serial dilution pipetting protocol. The indexing sections 120A-120C are again multiplexed so that indexing sections 120A, 120B are presented to the carrier for completion of the compound addition pipetting protocol and the serial dilution pipetting protocol.

As can be seen above, while pipetting protocol operations are being performed by the carrier 130 in the work section 104 on work item holders 118 disposed in the work item holder docks 121A-121n of one or more indexing sections 120A-120n, work item holders 118 are transferred from the storage section 106 by the articulated bot arm 122 to other indexing sections 120A-120n to provide for the substantially continuous uninterrupted flow of work item holders 118. As also described above, the operations of the carrier 130 and the articulated bot arm 122 are coordinated by the controller 199 so that work items are randomly accessed by both the articulated bot arm 122 (from the automated random access storage array 107) and the carrier (from the indexing sections) for performing one or more desired pipetting protocols, such as those described herein, and maintaining the substantially continuous uninterrupted execution of pipetting protocols.

Referring to FIGS. 1, 5A, 5B, and 7, an exemplary method 700 will be described in accordance with one or more aspects of the present disclosure. The method 700 includes providing the frame 101 (FIG. 7, Block 701). A multiplex pipette cartridge section 138 is provided (FIG. 7, Block 705). As described herein, the multiplex pipette cartridge section 138 is connected to the frame 101 and has the array of multiple pipette cartridge docks 139A-139n arrayed along the array axis 590. Each multiple pipette cartridge dock 139A-139n of the multiple pipette cartridge docks 139A-139n is configured to dock a corresponding pipette cartridge 114A-114n, where at least one pipette cartridge 114A-114n of the corresponding pipette cartridge 114A-114n has a different pipetting characteristic from another corresponding pipette cartridge 114A-114n, and the different pipetting characteristic is selectable from a number of different pipetting characteristics, such as described above.

The multiplexing work item holder 116 is provided (FIG. 7, Block 710). The multiplexing work item holder 116 is connected to the frame 101 and has the array of work item holder docks 121A-121n disposed facing the array of multiple pipette cartridge docks 139A-139n. The multiplexing work item holder 116 is substantially aligned with the array axis 590, where each work item holder dock 121A-121n of the array of work item holder docks 121A-121n is configured to dock the corresponding work item holder 118 selectable from the number of different interchangeable pipette trays 201A-201n (each having a different work characteristic), and the at least one pipette tip set rack 211A-211n that defines the selectable different pipetting characteristic. The multiplexing work item holder 116 has indexing sections 120 indexing one or more of the work item holder docks 121A-121n relative to the frame 101 between different positions so as to selectably multiplex both the different interchangeable pipette trays 201A-201n and the at least one pipette tip set rack 211A-211n corresponding to the work item holder dock 121A-121n.

The carrier 130, which is connected to the frame 101 and including the gantry 131, moves the at least one pipette cartridge 114A-114n or the work item holder carriage 132, of the carrier 130, relative to the frame 101 (FIG. 7, Block 715) between the array of multiple pipette cartridge docks 139A-139n and the array of work item holder docks 121A-121n multiplexing the at least one pipette cartridge 114A-114n and interfacing the at least one pipette cartridge 114A-114n with multiplexing one of the different interchangeable pipette trays 201A-201n and the at least one pipette tip set rack 211A-211n at the array of work item holder docks 121A-121n. The controller 199, which is communicably coupled to the multiplexing work item holder 116 and the carrier 130, selects (as described above) the at least one pipette tip set rack 211A-211n (FIG. 7, Block 720) corresponding to the work item holder dock 121A-121B so as to effect automatic selection of the different pipetting characteristic of the at least one pipette cartridge 114A-114n via the (multiplexed) interface between the at least one pipette cartridge 114A-114n and the at least one pipette tip set rack 211A-211n at the array of work item holder docks 121A-121n.

As described above, the controller 199 controls multiplexing of the number of different interchangeable pipette trays 201A-201n (FIG. 7, Block 725) with the multiplexing work item holder 116 according to the different pipette characteristic of the at least one pipette cartridge 114A-114n. In accordance with the method 700, the user enters or selects in the controller 199, through a user interface 308 of the automatic assaying system 100, multiple predetermined pipetting/work protocols based on source pipette trays (i.e., pipette trays having a source of specimens on which assays are to be performed) and/or pipette tip set rack holders 211A-211n held in the storage section 106 as described herein and the locations of the corresponding work item holders 118 are mapped within the storage section 106, as also described herein. The controller 199 is configured to, based on the selected pipetting protocols, identify and determine (from the map of the storage locations noted above) locations of the source pipette tray(s), the destination pipette tray(s), and/or the pipetting tip set rack(s) desired for each of the selected pipetting/work protocols as described herein. The controller 199 generates a multiplexing/sequencing of the desired work item holders 118 to move the desired work item holders automatically from the storage section 106 to the work section 104, and then back to the storage section 106 or to any suitable output of the automatic assaying system 100 (where output of the work item holder 118 effects transfer of the work item holder 118 to the user). The articulated bot arm 122 automatically transports (i.e., in accordance with the multiplexing/sequencing of the desired work item holders 118) each of at least one of the number of different interchangeable pipette trays 201A-201n and the at least one pipette tip set rack 211A-211n from the storage section 106 (FIG. 7, Block 730) to and from the storage section 106 and loading and unloading a corresponding work item holder dock 121A-121n with the at least one of the number of different interchangeable pipette trays 201A-201n and the at least one pipette tip set rack 211A-211n transported. To identify which work item holders 118 are to be transferred, the reader 198 reads identification indicia (FIG. 7, Block 735) identifying a tray characteristic and rack characteristic related to the different pipetting characteristic, of each pipette tray 201A-201n and each of the at least one pipette tip set rack 211A-211n stored in the automated random access storage array 107 of the storage section 106.

As described above, the work item holders 118 are transferred from the storage section 106 to the work section 104 to effect pipetting protocols. In one or more aspects, one of the number of different interchangeable pipette trays 201A-201n is a source tray and another of the different interchangeable pipette trays is a destination tray (See FIG. 6A), and the method 700 includes, with the at least one pipette cartridge 114A-114n, replicating contents of the source tray to the destination tray (FIG. 7, Block 740). In one or more aspects, one of the number of different interchangeable pipette trays 201A-201n is a source tray and another of the different interchangeable pipette trays is a destination tray, where the method includes, with the at least one pipette cartridge 114A-114n, tray reformatting (FIG. 7, Block 745). Where there are multiple destination trays and the tray reformatting comprises a tray expansion, samples are moved with the at least one pipette cartridge 114A-114n, from a single source tray to the multiple destination trays (see FIG. 6A). Where there are multiple source trays and the tray reformatting comprises a tray compression, samples are moved with the at least one pipette cartridge 114A-114n, from the multiple source trays to a single destination tray (see FIG. 6A). In one or more aspects, the method 700 includes, with the at least one pipette cartridge 114A-114n, adding a reagent (FIG. 7, Block 750) to at least one of the different interchangeable pipette trays 201A-201n docked in the array of work item holder docks 121A-121n. In one or more aspects, one of the number of different interchangeable pipette trays 201A-201n is a source tray and another of the different interchangeable pipette trays is a destination tray, and the method 700 includes, with the at least one pipette cartridge 114A-114n, a compound addition (FIG. 7, Block 755) where a set of compounds or samples are moved from the source tray to the destination tray (see FIG. 6A). In one or more aspects, a serial dilution of samples in at least one of the different interchangeable pipette trays 201A-201n docked in the array of work item holder docks 121A-121n is performed with the at least one pipette cartridge 114A-114n (FIG. 7, Block 760).

Figure 8:
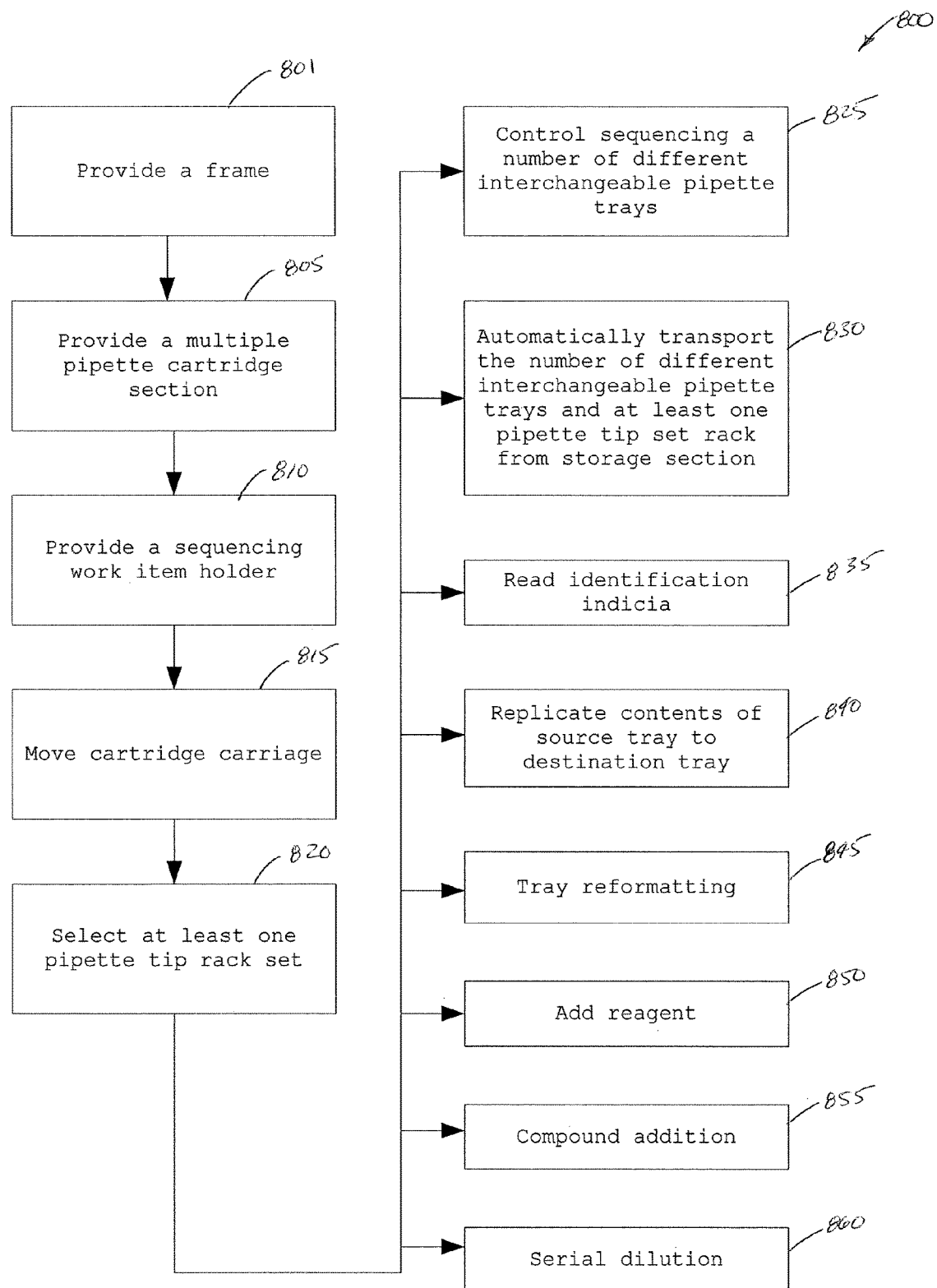
FIG. 8 is a block diagram of an exemplary method incorporating aspects of the present disclosure.

Referring to FIGS. 1, 5A, 5B, and 8, an exemplary method 800 will be described in accordance with one or more aspects of the present disclosure. The method 800 includes providing a frame 101 (FIG. 8, Block 801). A multiplex pipette cartridge section 138 is provided (FIG. 8, Block 805). As described herein, the multiplex pipette cartridge section 138 is connected to the frame 101 and has an array of multiple pipette cartridge docks 139A-139n arrayed along the array axis 590. Each respective multiple pipette cartridge dock 139A-139n is configured to dock the corresponding pipette cartridge 114A-114n, where at least one pipette cartridge 114A-114n of the corresponding pipette cartridge 114A-114n has a selectably variable pipetting characteristic selectable from a number of different pipetting characteristics, such as described above.

The sequencing work item holder 116 is provided (FIG. 8, Block 810). The sequencing work item holder 116 is connected to the frame 101 and has the array of work item holder docks 121A-121n disposed substantially juxtaposed from and substantially aligned with the array axis 590, where each work item holder dock 121A-121n of the array of work item holder docks 121A-121n is configured to dock a corresponding work item holder 118A-118n selectable from a number of different interchangeable pipette trays 201A-201n (each having a different work characteristic) and at least one pipette tip set rack 211A-211n that defines the selectable different pipetting characteristic. The sequencing work item holder 116 has indexing sections 120 indexing one or more of the work item holder docks 121A-121n relative to the frame 101 between different position so as to selectably sequence both the different interchangeable pipette trays 201A-201n and the at least one pipette set rack 211A-211n corresponding to the work item holder dock 121A-121n.

The cartridge carriage (or gripper) 133 is moved (FIG. 8, Block 815), with the carrier 130 connected to the frame 101 and including the gantry 131, relative to the frame 101 so as to transport each corresponding pipette cartridge 114A-114n from the respective multiple pipette cartridge dock 139A-139n effecting random access sequencing of each corresponding pipette cartridge 114A-114n relative to the corresponding pipette trays 201A-201n and pipette tip set rack 211A-211n at each work item holder dock 121A-121n. The controller 199 selects, as described herein, the at least one pipette tip set rack 211A-211n (FIG. 8, Block 820) corresponding to the work item holder dock 121A-121n and effecting, via random access sequencing of each corresponding pipette cartridge 114A-114n, automatic selection of the different pipetting characteristic of at least one pipette cartridge 114A-114n.

As described above, the controller 199 controls sequencing the number of different interchangeable pipette trays 201A-201n (FIG. 8, Block 825) with the sequencing work item holder 116 according to the different pipette characteristic of the at least one pipette cartridge 114A-114n. In accordance with the method 800, the user enters or selects in the controller 199, through a user interface 308 of the automatic assaying system 100, multiple predetermined pipetting/work protocols based on source pipette trays (i.e., pipette trays having a source of specimens on which assays are to be performed) and/or pipette tip set rack holders 211A-211n held in the storage section 106 as described herein and the locations of the corresponding work item holders 118 are mapped within the storage section 106, as also described herein. The controller 199 is configured to, based on the selected pipetting protocols, identify and determine (from the map of the storage locations noted above) locations of the source pipette tray(s), the destination pipette tray(s), and/or the pipetting tip set rack(s) desired for each of the selected pipetting/work protocols as described herein. The controller 199 generates a multiplexing/sequencing of the desired work item holders 118 to move the desired work item holders automatically from the storage section 106 to the work section 104, and then back to the storage section 106 or to any suitable output of the automatic assaying system 100 (where output of the work item holder 118 effects transfer of the work item holder 118 to the user). The articulated bot arm 122 automatically transports (in accordance with the multiplexing/sequencing of the desired work item holders 118) each of at least one of the number of different interchangeable pipette trays 201A-201n and the at least one pipette tip set rack 211A-211n from the storage section 106 (FIG. 9, Block 830) to and from the storage section 106 and loading and unloading a corresponding work item holder dock 121A-121n with the at least one of the number of different interchangeable pipette trays 201A-201n and the at least one pipette tip set rack 211A-211n transported. To identify which work item holders 118 are to be transferred, the reader 198 reads identification indicia 199A-119n (FIG. 8, Block 835) identifying a tray characteristic and rack characteristic related to the different pipetting characteristic, of each pipette tray 201A-201n and each of the at least one pipette tip set rack 211A-211n stored in the automated random access storage array 107 of the storage section 106.

As described above, the work item holders 118 are transferred from the storage section 106 to the work section 104 to effect pipetting protocols. In one or more aspects, one of the number of different interchangeable pipette trays 201A-201n is a source tray and another of the different interchangeable pipette trays is a destination tray (See FIG. 6A), and the method 800 includes, with the at least one pipette cartridge 114A-114n, replicating contents of the source tray to the destination tray (FIG. 8, Block 840). In one or more aspects, one of the number of different interchangeable pipette trays 201A-201n is a source tray and another of the different interchangeable pipette trays is a destination tray, where the method includes, with the at least one pipette cartridge 114A-114n, tray reformatting (FIG. 8, Block 845). Where there are multiple destination trays and the tray reformatting comprises a tray expansion, samples are moved with the at least one pipette cartridge 114A-114n, from a single source tray to the multiple destination trays (see FIG. 6A). Where there are multiple source trays and the tray reformatting comprises a tray compression, samples are moved with the at least one pipette cartridge 114A-114n, from the multiple source trays to a single destination tray (see FIG. 6A). In one or more aspects, the method 800 includes, with the at least one pipette cartridge 114A-114n, adding a reagent (FIG. 8, Block 850) to at least one of the different interchangeable pipette trays 201A-201n docked in the array of work item holder docks 121A-121n. In one or more aspects, one of the number of different interchangeable pipette trays 201A-201n is a source tray and another of the different interchangeable pipette trays is a destination tray, and the method 800 includes, with the at least one pipette cartridge 114A-114n, a compound addition (FIG. 8, Block 855) where a set of compounds or samples are moved from the source tray to the destination tray (see FIG. 6A). In one or more aspects, a serial dilution of samples in at least one of the different interchangeable pipette trays 201A-201n docked in the array of work item holder docks 121A-121n is performed with the at least one pipette cartridge 114A-114n (FIG. 8, Block 860).

Figure 9:
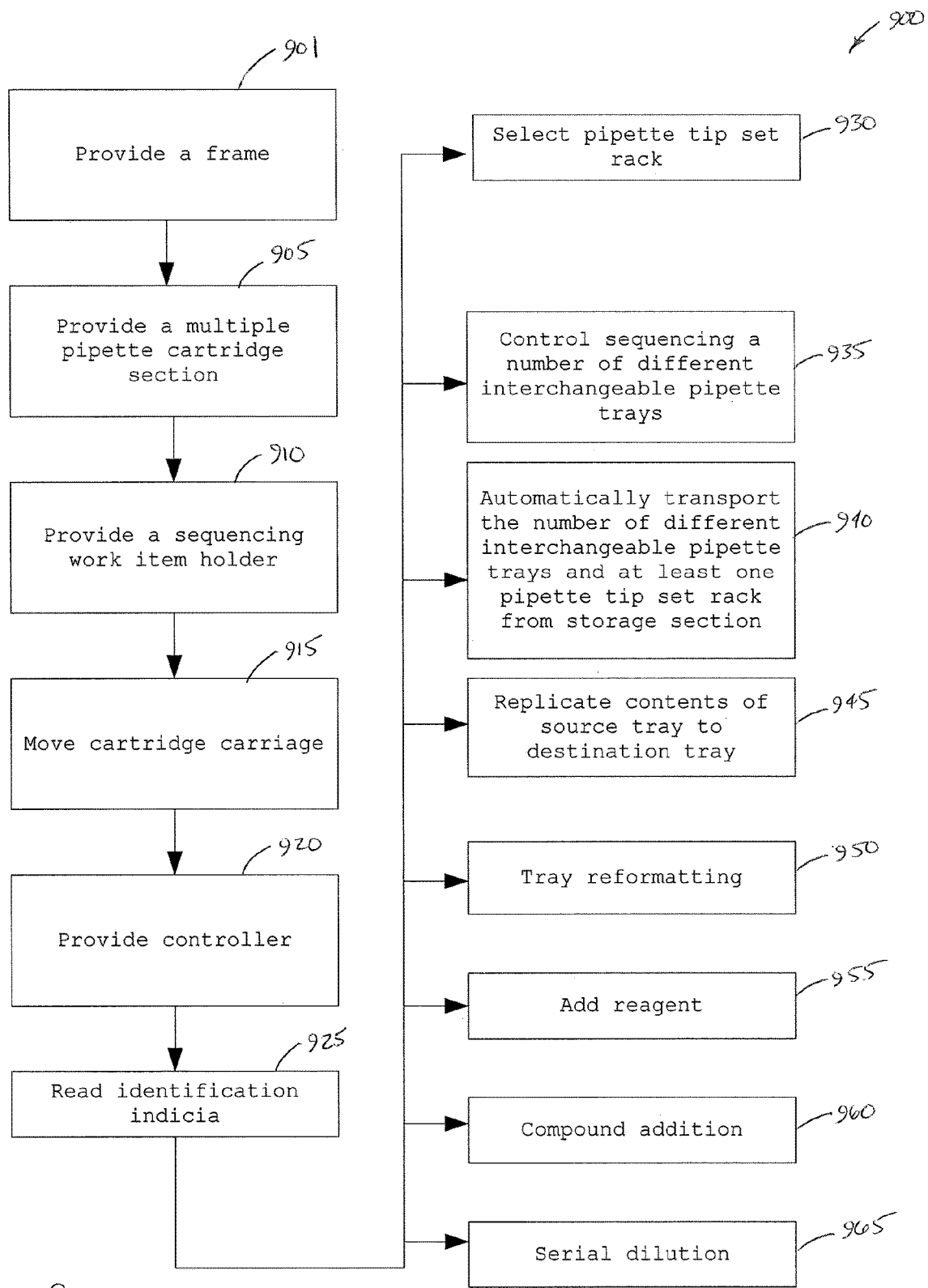
FIG. 9 is a block diagram of an exemplary method incorporating aspects of the present disclosure.

Referring to FIGS. 1, 5A, 5B, and 9, an exemplary method 900 will be described in accordance with one or more aspects of the present disclosure. The method 900 includes providing a frame 101 (FIG. 9, Block 901). A multiplex pipette cartridge section 138 is provided (FIG. 9, Block 905). As described herein the multiplex pipette cartridge section 138 is connected to the frame and has the array of multiple pipette cartridge docks 139A-139n arrayed along the array axis 590. Each respective multiple pipette cartridge dock 139A-139n is configured to dock a corresponding pipette cartridge 114A-114n, where at least one pipette cartridge 114A-114n of the corresponding pipette cartridge 114A-114n has a selectably variable pipetting characteristic selectable from a number of different pipetting characteristics, such as describe above.

The sequencing work item holder 116 is provided (FIG. 9, Block 910). As described herein, the sequencing work item holder 116 is connected to the frame and has the array of work item holder docks 121A-121n disposed substantially juxtaposed from and substantially aligned with the array axis 590, where each work item holder dock 121A-121n of the array of work item holder docks 121A-121n is configured to dock a corresponding work item holder 118A-118n selectable from a number of different interchangeable pipette trays 201A-201n (each having a different work characteristic) and at least one pipette tip set rack 211A-211n that defines the selectable different pipetting characteristic. The sequencing work item holder 116 has indexing sections 120 indexing the one or more of the work item holder docks relative to the frame between different positions so as to selectably sequence both the different interchangeable pipette trays and the at least one pipette set rack corresponding to the holder dock;

The cartridge carrier (or gripper) 133 is moved (FIG. 9, Block 915), with the carrier 130 connected to the frame 101 and including the gantry 131, relative to the frame 101 so as to transport each corresponding pipette cartridge 114A-114n from the respective multiple pipette cartridge dock 139A-139n effecting random access sequencing of each corresponding pipette cartridge 114A-114n relative to the corresponding pipette trays 201A-201n and pipette tip set rack 211A-211n at each work item holder dock 121A-121n.

In accordance with the method 900, the controller 199 is provided (FIG. 9, Block 920) and is connected to the reader 198. The method 900 includes reading, with the reader 198, the identification indicia 119A-119n (FIG. 9, Block 925) identifying a tray characteristic and a rack characteristic of each pipette tray 201A-201n and each of the at least one pipette tip set rack 211A-211n loaded in the corresponding work item holder dock 121A-121n, wherein the tray characteristic corresponds to at least one of the selectable different pipetting characteristic, and the rack characteristic is determinative of at least one of the selectable different pipetting characteristic. The method 900 includes selecting, with the controller 199, the at least one pipette tip set rack 211A-211n (FIG. 9, Block 930) corresponding to the work item holder dock 121A-121n and effecting, via random access sequencing of each corresponding pipette cartridge 114A-114n, automatic selection of the different pipetting characteristic of at least one pipette cartridge 114A-114n based on the rack characteristic identified by the reader 198.

As described above, the controller 199 sequences the number of different interchangeable pipette trays 201A-201n with the sequencing work item holder 116 (FIG. 9, Block 935) according to the different pipette characteristic of the at least one pipette cartridge 114A-114n. In accordance with the method 900, the user enters or selects in the controller 199, through a user interface 308 of the automatic assaying system 100, multiple predetermined pipetting/work protocols based on source pipette trays (i.e., pipette trays having a source of specimens on which assays are to be performed) and/or pipette tip set rack holders 211A-211n held in the storage section 106 as described herein and the locations of the corresponding work item holders 118 are mapped within the storage section 106, as also described herein. The controller 199 is configured to, based on the selected pipetting protocols, identify and determine (from the map of the storage locations noted above) locations of the source pipette tray(s), the destination pipette tray(s), and/or the pipetting tip set rack(s) desired for each of the selected pipetting/work protocols as described herein. The controller 199 generates a multiplexing/sequencing of the desired work item holders 118 to move the desired work item holders automatically from the storage section 106 to the work section 104, and then back to the storage section 106 or to any suitable output of the automatic assaying system 100 (where output of the work item holder 118 effects transfer of the work item holder 118 to the user). The articulated bot arm 122 automatically transports (in accordance with the multiplexing/sequencing of the desired work item holders 118) each of at least one of the number of different interchangeable pipette trays 201A-201n and the at least one pipette tip set rack 211A-211n from the storage section 106 (FIG. 9, Block 940) to and from the storage section 106 and loading and unloading a corresponding work item holder dock 121A-121n with the at least one of the number of different interchangeable pipette trays 201A-201n and the at least one pipette tip set rack 211A-211n transported. As described herein, to identify which work item holders 118 are to be transferred, the reader 198 reads identification indicia 199A-119n identifying a tray characteristic and rack characteristic related to the different pipetting characteristic, of each pipette tray 201A-201n and each of the at least one pipette tip set rack 211A-211n stored in the automated random access storage array 107 of the storage section 106.

As described above, the work item holders 118 are transferred from the storage section 106 to the work section 104 to effect pipetting protocols. In one or more aspects, one of the number of different interchangeable pipette trays 201A-201n is a source tray and another of the different interchangeable pipette trays is a destination tray (See FIG. 6A), and the method 900 includes, with the at least one pipette cartridge 114A-114n, replicating contents of the source tray to the destination tray (FIG. 9, Block 945). In one or more aspects, one of the number of different interchangeable pipette trays 201A-201n is a source tray and another of the different interchangeable pipette trays is a destination tray, where the method 900 includes, with the at least one pipette cartridge 114A-114n, tray reformatting (FIG. 9, Block 950). Where there are multiple destination trays and the tray reformatting comprises a tray expansion, samples are moved with the at least one pipette cartridge 114A-114n, from a single source tray to the multiple destination trays (see FIG. 6A). Where there are multiple source trays and the tray reformatting comprises a tray compression, samples are moved with the at least one pipette cartridge 114A-114n, from the multiple source trays to a single destination tray (see FIG. 6A). In one or more aspects, the method 900 includes, with the at least one pipette cartridge 114A-114n, adding a reagent (FIG. 9, Block 955) to at least one of the different interchangeable pipette trays 201A-201n docked in the array of work item holder docks 121A-121n. In one or more aspects, one of the number of different interchangeable pipette trays 201A-201n is a source tray and another of the different interchangeable pipette trays is a destination tray, and the method 900 includes, with the at least one pipette cartridge 114A-114n, a compound addition (FIG. 9, Block 960) where a set of compounds or samples are moved from the source tray to the destination tray (see FIG. 6A). In one or more aspects, a serial dilution of samples in at least one of the different interchangeable pipette trays 201A-201n docked in the array of work item holder docks 121A-121n is performed with the at least one pipette cartridge 114A-114n (FIG. 9, Block 965).

In accordance with one or more aspects of the present disclosure an automatic assaying system comprises: a frame; a multiplex pipette cartridge section, connected to the frame, having an array of multiple pipette cartridge docks arrayed along an array axis, each multiple pipette cartridge dock of the multiple pipette cartridge docks is configured to dock a corresponding pipette cartridge, at least one pipette cartridge of the corresponding pipette cartridges having a different pipetting characteristic from another corresponding pipette cartridge, the different pipetting characteristic being selectable from a number of different pipetting characteristics; a multiplexing work item holder, connected to the frame, with an array of work item holder docks disposed facing the array of multiple pipette cartridge docks and substantially aligned with the array axis, each work item holder dock of the array of work item holder docks is configured to dock a corresponding work item holder selectable from: a number of different interchangeable pipette trays, each having a different work characteristic, and at least one pipette tip set rack that defines the selectable different pipetting characteristic, wherein the multiplexing work item holder has indexing sections indexing one or more of the work item holder docks relative to the frame between different positions so as to selectably multiplex both the different interchangeable pipette trays and the at least one pipette set rack corresponding to the work item holder dock; a carrier connected to the frame including a gantry arranged so as move the at least one pipette cartridge or a work item holder carriage, of the carrier, relative to the frame between the array of multiple pipette cartridge docks and the array of work item holder docks multiplexing the at least one pipette cartridge and interfacing the at least one pipette cartridge with multiplexing one of the different interchangeable pipette trays and the at least one pipette tip set rack at the array of work item holder docks; and a controller communicably coupled to the multiplexing work item holder and the carrier and configured to select the at least one pipette tip set rack corresponding to a work item holder dock so as to effect automatic selection of the different pipetting characteristic of the at least one pipette cartridge via the interface.

In accordance with one or more aspects of the present disclosure the number of different interchangeable pipette trays comprise pipette trays with different work sample wells or receptacles capacities.

In accordance with one or more aspects of the present disclosure the at least one pipette tip set rack is interchangeable from a number of different pipette tip set racks, each having a different set of a different predetermined number of one of more pipette tips.

In accordance with one or more aspects of the present disclosure the controller is configured so as to multiplex the number of different interchangeable pipette trays with the multiplexing work item holder according to the different pipette characteristic of the at least one pipette cartridge.

In accordance with one or more aspects of the present disclosure the number of different pipette trays multiplexing corresponds respectively with the different interchangeable pipetting characteristic, of the at least one pipette cartridge, ahead of automatic selection and behind automatic selection of the different pipetting characteristic.

In accordance with one or more aspects of the present disclosure the frame is arranged so that the multiplex pipette cartridge section, the multiplexing work item holder, and the carrier are disposed in a work section of the frame, and the system further comprises a storage section connected to the frame, having an automated random access storage array configured for storing therein each pipette tray of the number of different interchangeable pipette trays and each of the at least one pipette tip set rack isolated from the work section, where the number of different interchangeable pipette trays and the at least one pipette tip rack set are loaded and unloaded from at least one of the work item holder docks.

In accordance with one or more aspects of the present disclosure the automatic assaying system further comprises an articulated bot arm movably connected to the frame and configured for automatically transporting each of at least one of the number of different interchangeable pipette trays and the at least one pipette tip set rack from the storage section to and from the work section and loading and unloading a corresponding work item dock with the at least one of the number of different interchangeable pipette trays and the at least one pipette tip set rack transported.

In accordance with one or more aspects of the present disclosure the automatic assaying system further comprises a reader connected to the frame and communicably coupled to the controller, the reader being disposed to read identification indicia identifying a tray characteristic and rack characteristic related to the different pipetting characteristic, of each pipette tray and each of the at least one pipette tip set rack stored in the automated random access storage array of the storage section.

In accordance with one or more aspects of the present disclosure the identification indicia further identify a tray characteristic relating the pipette tray to other pipette trays of a set of pipette trays with the different pipetting characteristic common to each pipette tray of the set.

In accordance with one or more aspects of the present disclosure the automatic assaying system comprises: a frame; a multiplex pipette cartridge section, connected to the frame, having an array of multiple pipette cartridge docks arrayed along an array axis, each respective multiple pipette cartridge dock is configured to dock a corresponding pipette cartridge, at least one pipette cartridge of the corresponding pipette cartridge having a selectably variable pipetting characteristic selectable from a number of different pipetting characteristics; a sequencing work item holder, connected to the frame, with an array of work item holder docks disposed substantially juxtaposed from and substantially aligned with the array axis, each work item holder dock of the array of work item holder docks is configured to dock a corresponding work item holder selectable from: a number of different interchangeable pipette trays, each having a different work characteristic, and at least one pipette tip set rack that defines the selectable different pipetting characteristic, wherein the sequencing work item holder has indexing sections indexing one or more of the work item holder docks relative to the frame between different positions so as to selectably sequence both the different interchangeable pipette trays and the at least one pipette set rack corresponding to the work item holder dock; a carrier connected to the frame including a gantry arranged so as move a cartridge carriage, of the carrier, relative to the frame so as to transport each corresponding pipette cartridge from the respective multiple pipette cartridge dock effecting random access sequencing of each corresponding pipette cartridge relative to the corresponding pipette trays and pipette tip set rack at each work item holder dock; and a controller communicably coupled to the sequencing work item holder and the carrier and configured to select the at least one pipette tip set rack corresponding to the work item holder dock and effect, via random access sequencing of each corresponding pipette cartridge, automatic selection of the different pipetting characteristic of at least one pipette cartridge.

In accordance with one or more aspects of the present disclosure the number of different interchangeable pipette trays comprise pipette trays with different work sample wells or receptacles capacities.

In accordance with one or more aspects of the present disclosure the at least one pipette tip set rack is interchangeable from a number of different pipette tip set racks, each having a different set of a different predetermined number of one of more pipette tips.

In accordance with one or more aspects of the present disclosure the controller is configured so as to sequence the number of different interchangeable pipette trays with the sequencing work item holder according to the different pipette characteristic of the at least one pipette cartridge.

In accordance with one or more aspects of the present disclosure the number of different interchangeable pipette trays sequencing corresponds respectively with the different pipetting characteristic, of the at least one pipette cartridge, ahead of automatic selection and behind automatic selection of the different pipetting characteristic.

In accordance with one or more aspects of the present disclosure the frame is arranged so that the multiplex pipette cartridge section, the sequencing work item holder, and the carrier are disposed in a work section of the frame, and the system further comprises a storage section connected to the frame, having an automated random access storage array configured for storing therein each pipette tray of the number of different interchangeable pipette trays and each of the at least one pipette tip set rack isolated from the work section loaded and unloaded from at least one of the work item holder docks.

In accordance with one or more aspects of the present disclosure the automatic assaying system further comprises an articulated bot arm movably connected to the frame and configured for automatically transporting each of at least one of the number of different interchangeable pipette trays and the at least one pipette tip set rack from the storage section to and from the storage section and loading and unloading a corresponding work item holder dock with the at least one of the number of different interchangeable pipette trays and the at least one pipette tip set rack transported.

In accordance with one or more aspects of the present disclosure the automatic assaying system further comprises a reader connected to the frame and communicably coupled to the controller, the reader being disposed to read identification indicia identifying a tray characteristic and rack characteristic related to the different pipetting characteristic, of each pipette tray and each of the at least one pipette tip set rack stored in the automated random access storage array of the storage section.

In accordance with one or more aspects of the present disclosure the identification indicia further identify a tray characteristic relating the pipette tray to other pipette trays of a set of pipette trays with the different pipetting characteristic common to each pipette tray of the set.

In accordance with one or more aspects of the present disclosure an automatic assaying system comprises: a frame; a multiplex pipette cartridge section, connected to the frame, having an array of multiple pipette cartridge docks arrayed along an array axis, each respective multiple pipette cartridge dock is configured to dock a corresponding pipette cartridge, at least one pipette cartridge of the corresponding pipette cartridge having a selectably variable pipetting characteristic selectable from a number of different pipetting characteristics; a sequencing work item holder, connected to the frame, with an array of work item holder docks disposed substantially juxtaposed from and substantially aligned with the array axis, each work item holder dock of the array of work item holder docks is configured to dock a corresponding work item holder selectable from: a number of different interchangeable pipette trays, each having a different work characteristic, and at least one pipette tip set rack that defines the selectable different pipetting characteristic, wherein the sequencing work item holder has indexing sections indexing the one or more of the work item holder docks relative to the frame between different positions so as to selectably sequence both the different interchangeable pipette trays and the at least one pipette set rack corresponding to the holder dock; a carrier connected to the frame including a gantry arranged so as move a cartridge carriage, of the carrier, relative to the frame so as to transport each corresponding pipette cartridge from the respective multiple pipette cartridge dock effecting random access sequencing of each corresponding pipette cartridge relative to the corresponding pipette trays and pipette tip set rack at each work item holder dock; a controller communicably coupled to the sequencing work item holder and the carrier; and a reader connected to the frame and communicably coupled to the controller, the reader being disposed to read identification indicia identifying a tray characteristic and a rack characteristic of each pipette tray and each of the at least one pipette tip set rack loaded in the corresponding work item holder dock, wherein the tray characteristic corresponds to at least one of the selectable different pipetting characteristic, and the rack characteristic is determinative of at least one of the selectable different pipetting characteristic.

In accordance with one or more aspects of the present disclosure the controller is configured to select the at least one pipette tip set rack corresponding to the work item holder dock and effect, via random access sequencing of each corresponding pipette cartridge, automatic selection of the different pipetting characteristic of at least one pipette cartridge based on the rack characteristic identified by the reader.

In accordance with one or more aspects of the present disclosure the number of different interchangeable pipette trays comprise pipette trays with different work sample wells or receptacles capacities.

In accordance with one or more aspects of the present disclosure the at least one pipette tip set rack is interchangeable from a number of different pipette tip set racks, each having a different set of a different predetermined number of one of more pipette tips.

In accordance with one or more aspects of the present disclosure the controller is configured so as to sequence the number of different interchangeable pipette trays with the sequencing work item holder according to the different pipette characteristic of the at least one pipette cartridge.

In accordance with one or more aspects of the present disclosure the number of different interchangeable pipette trays sequencing corresponds respectively with the different pipetting characteristic, of the at least one pipette cartridge, ahead of automatic selection and behind automatic selection of the different pipetting characteristic.

In accordance with one or more aspects of the present disclosure the frame is arranged so that the multiplex pipette cartridge section, the sequencing work item holder, and the carrier are disposed in a work section of the frame, and the system further comprises a storage section connected to the frame, having an automated random access storage array configured for storing therein each pipette tray of the number of different interchangeable pipette trays and each of the at least one pipette tip set rack isolated from the work section loaded and unloaded from at least one of the work item holder docks.

In accordance with one or more aspects of the present disclosure the automatic assaying system further comprises an articulated bot arm movably connected to the frame and configured for automatically transporting each of at least one of the number of different interchangeable pipette trays and the at least one pipette tip set rack from the storage section to and from the storage section and loading and unloading a corresponding work item holder dock with the at least one of the number of different interchangeable pipette trays and the at least one pipette tip set rack transported.

In accordance with one or more aspects of the present disclosure the identification indicia further identify a tray characteristic relating the pipette tray to other pipette trays of a set of pipette trays with the different pipetting characteristic common to each pipette tray of the set.

In accordance with one or more aspects of the present disclosure a method in an automatic assaying system is provided. The method comprises: providing a frame; providing a multiplex pipette cartridge section, connected to the frame, having an array of multiple pipette cartridge docks arrayed along an array axis, each multiple pipette cartridge dock of the multiple pipette cartridge docks is configured to dock a corresponding pipette cartridge, at least one pipette cartridge of the corresponding pipette cartridge having a different pipetting characteristic from another corresponding pipette cartridge, the different pipetting characteristic being selectable from a number of different pipetting characteristics; providing a multiplexing work item holder, connected to the frame, with an array of work item holder docks disposed facing the array of multiple pipette cartridge docks and substantially aligned with the array axis, each work item holder dock of the array of work item holder docks is configured to dock a corresponding work item holder selectable from: a number of different interchangeable pipette trays, each having a different work characteristic, and at least one pipette tip set rack that defines the selectable different pipetting characteristic, wherein the multiplexing work item holder has indexing sections indexing one or more of the work item holder docks relative to the frame between different positions so as to selectably multiplex both the different interchangeable pipette trays and the at least one pipette set rack corresponding to the work item holder dock; moving, with a carrier connected to the frame and including a gantry, the at least one pipette cartridge or a work item holder carriage, of the carrier, relative to the frame between the array of multiple pipette cartridge docks and the array of work item holder docks multiplexing the at least one pipette cartridge and interfacing the at least one pipette cartridge with multiplexing one of the different interchangeable pipette trays and the at least one pipette tip set rack at the array of work item holder docks; and selecting, with a controller communicably coupled to the multiplexing work item holder and the carrier, the at least one pipette tip set rack corresponding to a work item holder dock so as to effect automatic selection of the different pipetting characteristic of the at least one pipette cartridge via the interface.

In accordance with one or more aspects of the present disclosure the number of different interchangeable pipette trays comprise pipette trays with different work sample wells or receptacles capacities.

In accordance with one or more aspects of the present disclosure he at least one pipette tip set rack is interchangeable from a number of different pipette tip set racks, each having a different set of a different predetermined number of one of more pipette tips.

In accordance with one or more aspects of the present disclosure the method further comprises, with the controller, multiplexing the number of different interchangeable pipette trays with the multiplexing work item holder according to the different pipette characteristic of the at least one pipette cartridge.

In accordance with one or more aspects of the present disclosure the number of different pipette trays multiplexing corresponds respectively with the different interchangeable pipetting characteristic, of the at least one pipette cartridge, ahead of automatic selection and behind automatic selection of the different pipetting characteristic.

In accordance with one or more aspects of the present disclosure the frame is arranged so that the multiplex pipette cartridge section, the multiplexing work item holder, and the carrier are disposed in a work section of the frame, and the system further comprises a storage section connected to the frame, having an automated random access storage array configured for storing therein each pipette tray of the number of different interchangeable pipette trays and each of the at least one pipette tip set rack isolated from the work section loaded and unloaded from at least one of the work item holder docks.

In accordance with one or more aspects of the present disclosure the method further comprises, with an articulated bot arm movably connected to the frame, automatically transporting each of at least one of the number of different interchangeable pipette trays and the at least one pipette tip set rack from the storage section to and from the storage section and loading and unloading a corresponding work item holder dock with the at least one of the number of different interchangeable pipette trays and the at least one pipette tip set rack transported.

In accordance with one or more aspects of the present disclosure the method further comprises, with a reader connected to the frame and communicably coupled to the controller, reading identification indicia identifying a tray characteristic and rack characteristic related to the different pipetting characteristic, of each pipette tray and each of the at least one pipette tip set rack stored in the automated random access storage array of the storage section.

In accordance with one or more aspects of the present disclosure the identification indicia further identify a tray characteristic relating the pipette tray to other pipette trays of a set of pipette trays with the different pipetting characteristic common to each pipette tray of the set.

In accordance with one or more aspects of the present disclosure one of the number of different interchangeable pipette trays is a source tray and another of the different interchangeable pipette trays is a destination tray, the method further comprising, with the at least one pipette cartridge, replicating contents of the source tray to the destination tray.

In accordance with one or more aspects of the present disclosure one of the number of different interchangeable pipette trays is a source tray and another of the different interchangeable pipette trays is a destination tray, the method further comprising, with the at least one pipette cartridge, tray reformatting.

In accordance with one or more aspects of the present disclosure the destination tray includes a greater number of work sample wells than the source tray and the tray reformatting comprises a tray expansion where samples are moved with the at least one pipette cartridge, from a lesser number of work sample wells of the source tray to the greater number of work sample wells of the destination tray.

In accordance with one or more aspects of the present disclosure the source tray includes a greater number of work sample wells than the destination tray and the tray reformatting comprises a tray compression where samples are moved with the at least one pipette cartridge, from the greater number of work sample wells of the source tray to a lesser number of work sample wells of the destination tray.

In accordance with one or more aspects of the present disclosure the method further comprises, with the at least one pipette cartridge, adding a reagent to at least one of the different interchangeable pipette trays docked in the array of work item holder docks.

In accordance with one or more aspects of the present disclosure one of the number of different interchangeable pipette trays is a source tray and another of the different interchangeable pipette trays is a destination tray, the method further comprising, with the at least one pipette cartridge, a compound addition where a set of compounds or samples are moved from the source tray to the destination tray.

In accordance with one or more aspects of the present disclosure the method further comprises, with the at least one pipette cartridge, a serial dilution of samples in at least one of the different interchangeable pipette trays docked in the array of work item holder docks.

In accordance with one or more aspects of the present disclosure a method in an automatic assaying system is provided. The method comprises: providing a frame; providing a multiplex pipette cartridge section, connected to the frame, having an array of multiple pipette cartridge docks arrayed along an array axis, each respective multiple pipette cartridge dock is configured to dock a corresponding pipette cartridge, at least one pipette cartridge of the corresponding pipette cartridge having a selectably variable pipetting characteristic selectable from a number of different pipetting characteristics; providing a sequencing work item holder, connected to the frame, with an array of work item holder docks disposed substantially juxtaposed from and substantially aligned with the array axis, each work item holder dock of the array of work item holder docks is configured to dock a corresponding work item holder selectable from: a number of different interchangeable pipette trays, each having a different work characteristic, and at least one pipette tip set rack that defines the selectable different pipetting characteristic, wherein the sequencing work item holder has indexing sections indexing one or more of the work item holder docks relative to the frame between different position so as to selectably sequence both the different interchangeable pipette trays and the at least one pipette set rack corresponding to the work item holder dock; moving, with a carrier connected to the frame and including a gantry, a cartridge carriage, of the carrier, relative to the frame so as to transport each corresponding pipette cartridge from the respective multiple pipette cartridge dock effecting random access sequencing of each corresponding pipette cartridge relative to the corresponding pipette trays and pipette tip set rack at each work item holder dock; and selecting, with a controller communicably coupled to the sequencing work item holder and the carrier, the at least one pipette tip set rack corresponding to the work item holder dock and effecting, via random access sequencing of each corresponding pipette cartridge, automatic selection of the different pipetting characteristic of at least one pipette cartridge.

In accordance with one or more aspects of the present disclosure the number of different interchangeable pipette trays comprise pipette trays with different work sample wells or receptacles capacities.

In accordance with one or more aspects of the present disclosure the at least one pipette tip set rack is interchangeable from a number of different pipette tip set racks, each having a different set of a different predetermined number of one of more pipette tips.

In accordance with one or more aspects of the present disclosure the method further comprises, with the controller, sequencing the number of different interchangeable pipette trays with the sequencing work item holder according to the different pipette characteristic of the at least one pipette cartridge.

In accordance with one or more aspects of the present disclosure the number of different interchangeable pipette trays sequencing corresponds respectively with the different pipetting characteristic, of the at least one pipette cartridge, ahead of automatic selection and behind automatic selection of the different pipetting characteristic.

In accordance with one or more aspects of the present disclosure the frame is arranged so that the multiplex pipette cartridge section, the sequencing work item holder, and the carrier are disposed in a work section of the frame, and the system further comprises a storage section connected to the frame, having an automated random access storage array configured for storing therein each pipette tray of the number of different interchangeable pipette trays and each of the at least one pipette tip set rack isolated from the work section loaded and unloaded from at least one of the work item holder docks.

In accordance with one or more aspects of the present disclosure the method further comprises, with an articulated bot arm movably connected to the frame, automatically transporting each of at least one of the number of different interchangeable pipette trays and the at least one pipette tip set rack from the storage section to and from the storage section and loading and unloading a corresponding work item holder dock with the at least one of the number of different interchangeable pipette trays and the at least one pipette tip set rack transported.

In accordance with one or more aspects of the present disclosure the method further comprises, with a reader connected to the frame and communicably coupled to the controller, reading identification indicia identifying a tray characteristic and rack characteristic related to the different pipetting characteristic, of each pipette tray and each of the at least one pipette tip set rack stored in the automated random access storage array of the storage section.

In accordance with one or more aspects of the present disclosure the identification indicia further identify a tray characteristic relating the pipette tray to other pipette trays of a set of pipette trays with the different pipetting characteristic common to each pipette tray of the set.

In accordance with one or more aspects of the present disclosure one of the number of different interchangeable pipette trays is a source tray and another of the different interchangeable pipette trays is a destination tray, the method further comprising, with the at least one pipette cartridge, replicating contents of the source tray to the destination tray.

In accordance with one or more aspects of the present disclosure one of the number of different interchangeable pipette trays is a source tray and another of the different interchangeable pipette trays is a destination tray, the method further comprising, with the at least one pipette cartridge, tray reformatting.

In accordance with one or more aspects of the present disclosure the destination tray includes a greater number of work sample wells than the source tray and the tray reformatting comprises a tray expansion where samples are moved with the at least one pipette cartridge, from a lesser number of work sample wells of the source tray to the greater number of work sample wells of the destination tray.

In accordance with one or more aspects of the present disclosure the source tray includes a greater number of work sample wells than the destination tray and the tray reformatting comprises a tray compression where samples are moved with the at least one pipette cartridge, from the greater number of work sample wells of the source tray to a lesser number of work sample wells of the destination tray.

In accordance with one or more aspects of the present disclosure the method further comprises, with the at least one pipette cartridge, adding a reagent to at least one of the different interchangeable pipette trays docked in the array of work item holder docks.

In accordance with one or more aspects of the present disclosure one of the number of different interchangeable pipette trays is a source tray and another of the different interchangeable pipette trays is a destination tray, the method further comprising, with the at least one pipette cartridge, a compound addition where a set of compounds or samples are moved from the source tray to the destination tray.

In accordance with one or more aspects of the present disclosure the method further comprises, with the at least one pipette cartridge, a serial dilution of samples in at least one of the different interchangeable pipette trays docked in the array of work item holder docks.

In accordance with one or more aspects of the present disclosure a method in an automatic assaying system is provided. The method comprises: providing a frame; providing a multiplex pipette cartridge section, connected to the frame, having an array of multiple pipette cartridge docks arrayed along an array axis, each respective multiple pipette cartridge dock is configured to dock a corresponding pipette cartridge, at least one pipette cartridge of the corresponding pipette cartridge having a selectably variable pipetting characteristic selectable from a number of different pipetting characteristics; providing a sequencing work item holder, connected to the frame, with an array of work item holder docks disposed substantially juxtaposed from and substantially aligned with the array axis, each work item holder dock of the array of work item holder docks is configured to dock a corresponding work item holder selectable from: a number of different interchangeable pipette trays, each having a different work characteristic, and at least one pipette tip set rack that defines the selectable different pipetting characteristic, wherein the sequencing work item holder has indexing sections indexing the one or more of the work item holder docks relative to the frame between different positions so as to selectably sequence both the different interchangeable pipette trays and the at least one pipette set rack corresponding to the holder dock; moving, with a carrier connected to the frame and including a gantry, a cartridge carriage, of the carrier, relative to the frame so as to transport each corresponding pipette cartridge from the respective multiple pipette cartridge dock effecting random access sequencing of each corresponding pipette cartridge relative to the corresponding pipette trays and pipette tip set rack at each work item holder dock; providing a controller communicably coupled to the sequencing work item holder and the carrier; and reading, with a reader connected to the frame and communicably coupled to the controller, identification indicia identifying a tray characteristic and a rack characteristic of each pipette tray and each of the at least one pipette tip set rack loaded in the corresponding work item holder dock, wherein the tray characteristic corresponds to at least one of the selectable different pipetting characteristic, and the rack characteristic is determinative of at least one of the selectable different pipetting characteristic.

In accordance with one or more aspects of the present disclosure the method further comprises selecting, with the controller, the at least one pipette tip set rack corresponding to the work item holder dock and effecting, via random access sequencing of each corresponding pipette cartridge, automatic selection of the different pipetting characteristic of at least one pipette cartridge based on the rack characteristic identified by the reader.

In accordance with one or more aspects of the present disclosure the number of different interchangeable pipette trays comprise pipette trays with different work sample wells or receptacles capacities.

6 In accordance with one or more aspects of the present disclosure the at least one pipette tip set rack is interchangeable from a number of different pipette tip set racks, each having a different set of a different predetermined number of one of more pipette tips.

In accordance with one or more aspects of the present disclosure the method further comprises, with the controller, sequencing the number of different interchangeable pipette trays with the sequencing work item holder according to the different pipette characteristic of the at least one pipette cartridge.

In accordance with one or more aspects of the present disclosure the number of different interchangeable pipette trays sequencing corresponds respectively with the different pipetting characteristic, of the at least one pipette cartridge, ahead of automatic selection and behind automatic selection of the different pipetting characteristic.

In accordance with one or more aspects of the present disclosure the frame is arranged so that the multiplex pipette cartridge section, the sequencing work item holder, and the carrier are disposed in a work section of the frame, and the system further comprises a storage section connected to the frame, having an automated random access storage array configured for storing therein each pipette tray of the number of different interchangeable pipette trays and each of the at least one pipette tip set rack isolated from the work section loaded and unloaded from at least one of the work item holder docks.

In accordance with one or more aspects of the present disclosure the method further comprises, with an articulated bot arm movably connected to the frame, automatically transporting each of at least one of the number of different interchangeable pipette trays and the at least one pipette tip set rack from the storage section to and from the storage section and loading and unloading a corresponding work item holder dock with the at least one of the number of different interchangeable pipette trays and the at least one pipette tip set rack transported.

In accordance with one or more aspects of the present disclosure the identification indicia further identify a tray characteristic relating the pipette tray to other pipette trays of a set of pipette trays with the different pipetting characteristic common to each pipette tray of the set.

In accordance with one or more aspects of the present disclosure one of the number of different interchangeable pipette trays is a source tray and another of the different interchangeable pipette trays is a destination tray, the method further comprising, with the at least one pipette cartridge, replicating contents of the source tray to the destination tray.

In accordance with one or more aspects of the present disclosure one of the number of different interchangeable pipette trays is a source tray and another of the different interchangeable pipette trays is a destination tray, the method further comprising, with the at least one pipette cartridge, tray reformatting.

In accordance with one or more aspects of the present disclosure the destination tray includes a greater number of work sample wells than the source tray and the tray reformatting comprises a tray expansion where samples are moved with the at least one pipette cartridge, from a lesser number of work sample wells of the source tray to the greater number of work sample wells of the destination tray.

In accordance with one or more aspects of the present disclosure the source tray includes a greater number of work sample wells than the destination tray and the tray reformatting comprises a tray compression where samples are moved with the at least one pipette cartridge, from the greater number of work sample wells of the source tray to a lesser number of work sample wells of the destination tray.

In accordance with one or more aspects of the present disclosure the method further comprises, with the at least one pipette cartridge, adding a reagent to at least one of the different interchangeable pipette trays docked in the array of work item holder docks.

In accordance with one or more aspects of the present disclosure one of the number of different interchangeable pipette trays is a source tray and another of the different interchangeable pipette trays is a destination tray, the method further comprising, with the at least one pipette cartridge, a compound addition where a set of compounds or samples are moved from the source tray to the destination tray.

In accordance with one or more aspects of the present disclosure the method further comprises, with the at least one pipette cartridge, a serial dilution of samples in at least one of the different interchangeable pipette trays docked in the array of work item holder docks.

In accordance with one or more aspects of the present disclosure an automatic assaying system comprises: a frame; a multiplex pipette cartridge section, connected to the frame, having an array of multiple pipette cartridge docks arrayed along an array axis, each respective multiple pipette cartridge dock is configured to dock a corresponding pipette cartridge, at least one pipette cartridge of the corresponding pipette cartridge having a selectably variable pipetting characteristic selectable from a number of different pipetting characteristics; a sequencing work item holder, connected to the frame, with an array of work item holder docks disposed substantially juxtaposed from and substantially aligned with the array axis, each work item holder dock is configured to dock a corresponding work item holder selectable from: a number of different interchangeable pipette trays, each having a different work characteristic, and at least one pipette tip set rack that defines the selectable different pipetting characteristic, wherein the sequencing work item holder has indexing sections indexing one or more of the work item holder docks relative to the frame between different position so as to selectably sequence both the pipette trays and the at least one pipette tip set rack corresponding to the work item holder dock; a carrier connected to the frame including a gantry arranged so as move a cartridge carriage, of the carrier, relative to the frame so as to transport each corresponding pipette cartridge from the respective multiple pipette cartridge dock effecting random access sequencing of each corresponding pipette cartridge relative to the corresponding pipette trays and the at least one pipette tip set rack at each work item holder dock; and a controller communicably coupled to the sequencing work item holder and the carrier and configured to register user selection of more than one predetermined work protocols, each based on a respective one of the different predetermined pipetting characteristics; wherein the controller is configured to automatically effect the registered more than one predetermined work protocols in a substantially continuous series, wherein for each different predetermined work protocol the controller resolves, based on the respective different predetermined pipetting characteristic, a different corresponding sequence of the pipette trays and the at least one pipette tip set rack in and with the sequencing work item holder (that determines sequence locations and indexing for each pipette tray and the at least one pipette tip set rack) for the corresponding sequence and sequence transition between different registered predetermined work protocols to effect the different registered predetermined work protocols substantially continuously.

In accordance with one or more aspects of the present disclosure the controller is configured to sequence the registered predetermined work protocols in series dependent on map info of the pipette trays and the at least one pipette tip set rack in store.

In accordance with one or more aspects of the present disclosure the number of different interchangeable pipette trays comprise pipette trays with different work sample wells or receptacles capacities.

In accordance with one or more aspects of the present disclosure the at least one pipette tip set rack is interchangeable from a number of different pipette tip set racks, each having a different set of a different predetermined number of one of more pipette tips.

In accordance with one or more aspects of the present disclosure the controller is configured so as to sequence the number of different interchangeable pipette trays with the sequencing work item holder according to the different pipette characteristic of the at least one pipette cartridge.

In accordance with one or more aspects of the present disclosure the number of different interchangeable pipette trays sequencing corresponds respectively with the different pipetting characteristic, of the at least one pipette cartridge, ahead of automatic selection and behind automatic selection of the different pipetting characteristic.

In accordance with one or more aspects of the present disclosure the frame is arranged so that the multiplex pipette cartridge section, the sequencing work item holder, and the carrier are disposed in a work section of the frame, and the system further comprises a storage section connected to the frame, having an automated random access storage array configured for storing therein each pipette tray of the number of different interchangeable pipette trays and each of the at least one pipette tip set rack isolated from the work section loaded and unloaded from at least one of the work item holder docks.

In accordance with one or more aspects of the present disclosure the automatic assaying system further comprises an articulated bot arm movably connected to the frame and configured for automatically transporting each of at least one of the number of different interchangeable pipette trays and the at least one pipette tip set rack from the storage section to and from the storage section and loading and unloading a corresponding work item holder dock with the at least one of the number of different interchangeable pipette trays and the at least one pipette tip set rack transported.

In accordance with one or more aspects of the present disclosure the automatic assaying system further comprises a reader connected to the frame and communicably coupled to the controller, the reader being disposed to read identification indicia identifying a tray characteristic and rack characteristic related to the different pipetting characteristic, of each pipette tray and each of the at least one pipette tip set rack stored in the automated random access storage array of the storage section.

In accordance with one or more aspects of the present disclosure the identification indicia further identify a tray characteristic relating the pipette tray to other pipette trays of a set of pipette trays with the different pipetting characteristic common to each pipette tray of the set.

It should be understood that the foregoing description is only illustrative of the aspects of the present disclosure. Various alternatives and modifications can be devised by those skilled in the art without departing from the aspects of the present disclosure. Accordingly, the aspects of the present disclosure are intended to embrace all such alternatives, modifications and variances that fall within the scope of any claims appended hereto. Further, the mere fact that different features are recited in mutually different dependent or independent claims does not indicate that a combination of these features cannot be advantageously used, such a combination remaining within the scope of the aspects of the present disclosure.

What is claimed is:

1. An automatic assaying system comprising:
a frame;
a multiplex pipette cartridge section, connected to the frame, having an array of multiple pipette cartridge docks arrayed along an array axis, each multiple pipette cartridge dock of the multiple pipette cartridge docks is configured to dock a corresponding pipette cartridge, at least one pipette cartridge of the corresponding pipette cartridge having a different pipetting characteristic from another corresponding pipette cartridge, the different pipetting characteristic being selectable from a number of different pipetting characteristics;
a multiplexing work item holder, connected to the frame, with an array of work item holder docks disposed facing the array of multiple pipette cartridge docks and substantially aligned with the array axis, each work item holder dock of the array of work item holder docks is configured to dock a corresponding multiplexing work item holder selectable from:
a number of different interchangeable pipette trays, each having a different work characteristic, and
at least one pipette tip set rack that defines the selectable different pipetting characteristic,
wherein the multiplexing work item holder has indexing sections indexing one or more of the work item holder docks relative to the frame between different positions so as to selectably multiplex both the different interchangeable pipette trays and the at least one pipette set rack corresponding to the work item holder dock;

a carrier connected to the frame including a gantry arranged so as to move the at least one pipette cartridge or a work item holder carriage, of the carrier, relative to the frame between the array of multiple pipette cartridge docks and the array of work item holder docks multiplexing the at least one pipette cartridge and interfacing the at least one pipette cartridge with multiplexing one of the different interchangeable pipette trays and the at least one pipette tip set rack at the array of work item holder docks; and a controller communicably coupled to the multiplexing work item holder and the carrier and configured to select the at least one pipette tip set rack corresponding to a work item holder dock so as to effect automatic selection of the different pipetting characteristic of the at least one pipette cartridge via the interface.

2. The automatic assaying system of claim 1, wherein the number of different interchangeable pipette trays comprise pipette trays with different work sample wells or receptacles capacities.

3. The automatic assaying system of claim 1, wherein the at least one pipette tip set rack is interchangeable from a number of different pipette tip set racks, each having a different set of a different predetermined number of one of more pipette tips.

4. The automatic assaying system of claim 1, wherein the controller is configured so as to multiplex the number of different interchangeable pipette trays with the multiplexing work item holder according to the different pipette characteristic of the at least one pipette cartridge.

5. The automatic assaying system of claim 1, wherein the number of different pipette trays multiplexing corresponds respectively with the different interchangeable pipetting characteristic, of the at least one pipette cartridge, ahead of automatic selection and behind automatic selection of the different pipetting characteristic.

6. The automatic assaying system of claim 1, wherein the frame is arranged so that the multiplex pipette cartridge section, the multiplexing work item holder, and the carrier are disposed in a work section of the frame, and the system further comprises a storage section connected to the frame, having an automated random access storage array configured for storing therein each pipette tray of the number of different interchangeable pipette trays and each of the at least one pipette tip set rack isolated from the work section, where the number of different interchangeable pipette trays and the at least one pipette tip rack set are loaded and unloaded from at least one of the work item holder docks.

7. The automatic assaying system of claim 6, further comprising an articulated bot arm movably connected to the frame and configured for automatically transporting each of at least one of the number of different interchangeable pipette trays and the at least one pipette tip set rack from the storage section to and from the work section and loading and unloading a corresponding work item dock with the at least one of the number of different interchangeable pipette trays and the at least one pipette tip set rack transported.

8. The automatic assaying system of claim 6, further comprising a reader connected to the frame and communicably coupled to the controller, the reader being disposed to read identification indicia identifying a tray characteristic and rack characteristic related to the different pipetting characteristic, of each pipette tray and each of the at least one pipette tip set rack stored in the automated random access storage array of the storage section.

9. The automatic assaying system of claim 8, wherein the identification indicia further identify a tray characteristic relating the pipette tray to other pipette trays of a set of pipette trays with the different pipetting characteristic common to each pipette tray of the set.

10. A method in an automatic assaying system, the method comprising:

providing a frame;

providing a multiplex pipette cartridge section, connected to the frame, having an array of multiple pipette cartridge docks arrayed along an array axis, each multiple pipette cartridge dock of the multiple pipette cartridge docks is configured to dock a corresponding pipette cartridge, at least one pipette cartridge of the corresponding pipette cartridge having a different pipetting characteristic from another corresponding pipette cartridge, the different pipetting characteristic being selectable from a number of different pipetting characteristics;

providing a multiplexing work item holder, connected to the frame, with an array of work item holder docks disposed facing the array of multiple pipette cartridge docks and substantially aligned with the array axis, each work item holder dock of the array of work item holder docks is configured to dock a corresponding work item holder selectable from:

a number of different interchangeable pipette trays, each having a different work characteristic, and at least one pipette tip set rack that defines the selectable different pipetting characteristic, wherein the multiplexing work item holder has indexing sections indexing one or more of the work item holder docks relative to the frame between different positions so as to selectably multiplex both the different interchangeable pipette trays and the at least one pipette set rack corresponding to the work item holder dock;

moving, with a carrier connected to the frame and including a gantry, the at least one pipette cartridge or a work item holder carriage, of the carrier, relative to the frame between the array of multiple pipette cartridge docks and the array of work item holder docks multiplexing the at least one pipette cartridge and interfacing the at least one pipette cartridge with multiplexing one of the different interchangeable pipette trays and the at least one pipette tip set rack at the array of work item holder docks; and selecting, with a controller communicably coupled to the multiplexing work item holder and the carrier, the at least one pipette tip set rack corresponding to a work item holder dock so as to effect automatic selection of the different pipetting characteristic of the at least one pipette cartridge via the interface.

11. The method of claim 10, wherein the frame is arranged so that the multiplex pipette cartridge section, the multiplexing work item holder, and the carrier are disposed in a work section of the frame, and the system further comprises a storage section connected to the frame, having an automated random access storage array configured for storing therein each pipette tray of the number of different interchangeable pipette trays and each of the at least one pipette tip set rack isolated from the work section loaded and unloaded from at least one of the work item holder docks.

12. The method of claim 11, further comprising, with a reader connected to the frame and communicably coupled to the controller, reading identification indicia identifying a tray characteristic and rack characteristic related to the different pipetting characteristic, of each pipette tray and each of the at least one pipette tip set rack stored in the automated random access storage array of the storage section.

13. The method of claim 10, wherein one of the number of different interchangeable pipette trays is a source tray and another of the different interchangeable pipette trays is a destination tray, the method further comprising, with the at least one pipette cartridge, replicating contents of the source tray to the destination tray.

14. The method of claim 10, wherein one of the number of different interchangeable pipette trays is a source tray and another of the different interchangeable pipette trays is a destination tray, the method further comprising, with the at least one pipette cartridge, tray reformatting.

15. The method of claim 10, wherein there are multiple destination trays and the tray reformatting comprises a tray expansion where samples are moved with the at least one pipette cartridge, from a single source tray to multiple destination trays.

16. The method of claim 10, wherein there are multiple source trays and the tray reformatting comprises a tray compression where samples are moved with the at least one pipette cartridge, from the multiple source trays to a single destination tray.

17. The method of claim 10, further comprising, with the at least one pipette cartridge, adding a reagent to at least one of the different interchangeable pipette trays docked in the array of work item holder docks.

18. The method of claim 10, wherein one of the number of different interchangeable pipette trays is a source tray and another of the different interchangeable pipette trays is a destination tray, the method further comprising, with the at least one pipette cartridge, a compound addition where a set of compounds or samples are moved from the source tray to the destination tray.

19. The method of claim 10, further comprising, with the at least one pipette cartridge, a serial dilution of samples in at least one of the different interchangeable pipette trays docked in the array of work item holder docks.

* * * * *